US012777096B2

(12) United States Patent
Lee et al.

(10) Patent No.: US 12,777,096 B2
(45) Date of Patent: Oct. 27, 2026

(54) WEARABLE DEVICE DATA EXCHANGE

(71) Applicant: QUALCOMM Incorporated, San Diego, CA (US)

(72) Inventors: Hyun Yong Lee, San Diego, CA (US); Peerapol Tinnakornsrisuphap, San Diego, CA (US); Prashanth Haridas Hande, San Diego, CA (US); Sudheer Manjunath Poojary, Bengaluru (IN); Balaji Srinivasan Thiruvenkatachari, Bengaluru (IN); Raj Kumar Krishna Kumar, Bangalore (IN); Rohit Kapoor, Bangalore (IN); Akshay Kumar Bajpai, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 19/065,555

(22) Filed: Feb. 27, 2025

(65) Prior Publication Data

US 2026/0254873 A1 Aug. 27, 2026

(51) Int. Cl.

*H04L 67/131* (2022.01)
*H04L 65/60* (2022.01)
*H04L 65/80* (2022.01)

(52) U.S. Cl.

CPC ............ *H04L 67/131* (2022.05); *H04L 65/60* (2013.01); *H04L 65/80* (2013.01)

(58) Field of Classification Search

CPC ...................................................... H04L 67/131
See application file for complete search history.

(56) References Cited

U.S. PATENT DOCUMENTS

| | | | | |
|---|---|---|---|---|
| 9,392,090 | B2 * | 7/2016 | Bran | H04M 1/6066 |
| 11,696,345 | B2 | 7/2023 | Xue et al. | |
| 11,889,447 | B2 * | 1/2024 | Leung | H04W 56/0045 |
| 12,634,669 | B2 * | 5/2026 | Yore | H04W 4/80 |
| 12,634,703 | B1 * | 5/2026 | Mikulskij | H04W 12/72 |
| 2020/0104578 | A1 * | 4/2020 | Cho | G06V 10/82 |
| 2021/0192186 | A1 * | 6/2021 | Kim | G06V 40/165 |
| 2022/0014962 | A1 * | 1/2022 | Bouazizi | H04L 47/2416 |
| 2023/0040689 | A1 * | 2/2023 | Leung | H04W 56/0045 |
| 2023/0120144 | A1 * | 4/2023 | Kim | H04W 48/18 370/329 |

FOREIGN PATENT DOCUMENTS

| | | |
|---|---|---|
| WO | 2022186929 A1 | 9/2022 |
| WO | 2024076820 A1 | 4/2024 |

OTHER PUBLICATIONS

International Search Report and Written Opinion—PCT/US2026/012553—ISA/EPO—Apr. 1, 2026.

* cited by examiner

*Primary Examiner* — Umar Cheema
(74) *Attorney, Agent, or Firm* — Harrity & Harrity, LLP/QUALCOMM Incorporated

(57) ABSTRACT

Various aspects of the present disclosure generally relate to wireless communication. In some aspects, a wireless device may identify a trigger for a transfer of data on a wireless link that is associated with extended reality. The wireless device may exchange the data on the wireless link using a data control action that is based at least in part on an application type of the transfer, where the application type is real-time streaming or non-real-time streaming. Numerous other aspects are described.

30 Claims, 17 Drawing Sheets

800

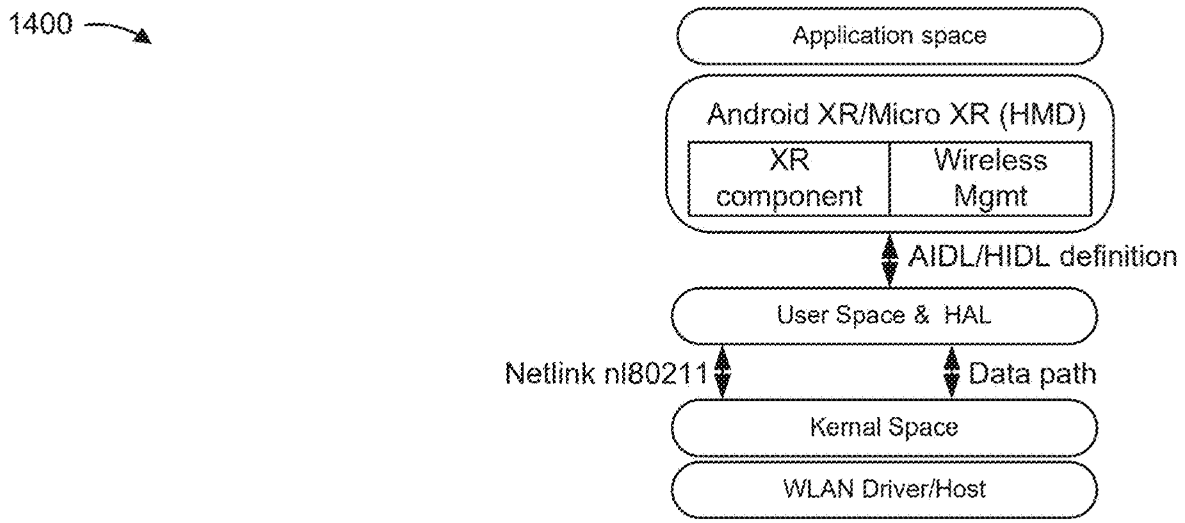

| API name | Interface description | Interface details |
|---|---|---|
| Configuration | Used for providing the configuration from application to connectivity layer | • Constraint (Time, Power)<br>• Monitoring window<br>• Periodic reporting request<br>• Application type (Real, Non-real) |
| Evaluation Request | Request from application to evaluate the initiating of a data traffic session | • Transmission Payload size<br>• FPS and Burst definition |
| Evaluation Response | Response with wireless metrics and/or processed feedback on data transfer.<br>Optionally: Can indicate (Proceed, Postpone) | • Signal strength, Throughput<br>• Channel availability %<br>• Estimate (Time, Power) |
| Wireless state notification | Periodic notifications on wireless metrics reflecting wireless channel state | • Signal strength, Throughput<br>• Channel availability % |
| Data traffic schedule request | Request from application to schedule a data transfer on satisfying wireless channel conditions that meet latency and power constraints. | • Time budget to drain traffic<br>• Requirement to satisfy for traffic initiation (Time, Power) |

FIG. 14

WEARABLE DEVICE DATA EXCHANGE

FIELD OF THE DISCLOSURE

Aspects of the present disclosure generally relate to wireless communication and specifically relate to techniques, apparatuses, and methods associated with data exchange for wearable devices.

BACKGROUND

Wireless communication systems are widely deployed to provide various services, which may involve carrying or supporting voice, text, other messaging, video, data, and/or other traffic. Typical wireless communication systems may employ multiple-access radio access technologies (RATs) capable of supporting communication among multiple wireless communication devices including user devices or other devices by sharing the available system resources (for example, time domain resources, frequency domain resources, spatial domain resources, and/or device transmit power, among other examples). Such multiple-access RATs are supported by technological advancements that have been adopted in various telecommunication standards, which define common protocols that enable different wireless communication devices to communicate on a local, municipal, national, regional, or global level.

An example telecommunication standard is New Radio (NR). NR, which may also be referred to as 5G, is part of a continuous mobile broadband evolution promulgated by the Third Generation Partnership Project (3GPP). NR (and other RATs beyond NR) may be designed to better support enhanced mobile broadband (eMBB) access, Internet of things (IoT) networks or reduced capability device deployments, and ultra-reliable low latency communication (URLLC) applications. To support these verticals, NR systems may be designed to implement a modularized functional infrastructure, a disaggregated and service-based network architecture, network function virtualization, network slicing, multi-access edge computing, millimeter wave (mmWave) technologies including massive multiple-input multiple-output (MIMO), licensed and unlicensed spectrum access, non-terrestrial network (NTN) deployments, sidelink and other device-to-device direct communication technologies (for example, cellular vehicle-to-everything (CV2X) communication), multiple-subscriber implementations, high-precision positioning, and/or radio frequency (RF) sensing, among other examples. As the demand for connectivity continues to increase, further improvements in NR may be implemented, and other RATs, such as 6G and beyond, may be introduced to enable new applications and facilitate new use cases.

Wireless communication systems are widely deployed to provide various types of communication content such as voice, video, packet data, messaging, broadcast, and so on. These systems may be multiple-access systems capable of supporting communication with multiple users by sharing the available system resources (for example, time, frequency, and power). A wireless network (e.g., a wireless local area network (WLAN), such as a Wi-Fi (e.g., Institute of Electrical and Electronics Engineers (IEEE) 802.11) network) may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. “Downlink” may refer to the communication link from the AP to the station, and “uplink” may refer to the communication link from the station to the AP.

The AP may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (WPAN), which may include a Bluetooth® connection, may provide for short range wireless connections between two or more paired wireless devices. For example, wireless devices such as cellular phones may utilize WPAN communications to exchange information such as audio signals with wireless headsets.

A wireless device may communicate using a short-range wireless protocol, such as a Bluetooth protocol, and may connect and exchange information between devices and paired devices (for example, between mobile phones, computers, digital cameras, wireless headsets, speakers, keyboards, mice or other input peripherals, and similar devices).

SUMMARY

Some aspects described herein relate to a method of wireless communication performed by a wireless device. The method may include identifying a trigger for a transfer of data on a wireless link that is associated with extended reality. The method may include exchanging the data on the wireless link using a data control action that is based at least in part on an application type of the transfer, where the application type is real-time streaming or non-real-time streaming.

Some aspects described herein relate to a wireless device. The wireless device may include a processing system. The processing system may include one or more processors and one or more code-storing memories coupled with the one or more processors. The processing system may be configured to cause the wireless device to identify a trigger for a transfer of data on a wireless link that is associated with extended reality. The processing system may be configured to cause the wireless device to exchange the data on the wireless link using a data control action that is based at least in part on an application type of the transfer, where the application type is real-time streaming or non-real-time streaming.

Some aspects described herein relate to a non-transitory computer-readable medium that stores a set of instructions for wireless communication by a wireless device. The set of instructions, when executed by one or more processors of the wireless device, may cause the wireless device to identify a trigger for a transfer of data on a wireless link that is associated with extended reality. The set of instructions, when executed by one or more processors of the wireless device, may cause the wireless device to exchange the data on the wireless link using a data control action that is based at least in part on an application type of the transfer, where the application type is real-time streaming or non-real-time streaming.

Some aspects described herein relate to an apparatus for wireless communication. The apparatus may include means for identifying a trigger for a transfer of data on a wireless link that is associated with extended reality. The apparatus may include means for exchanging the data on the wireless link using a data control action that is based at least in part on an application type of the transfer, where the application type is real-time streaming or non-real-time streaming.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, this specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 14 is a diagram illustrating an example of operations between layers of extended reality glasses.

DETAILED DESCRIPTION

Figure 1:
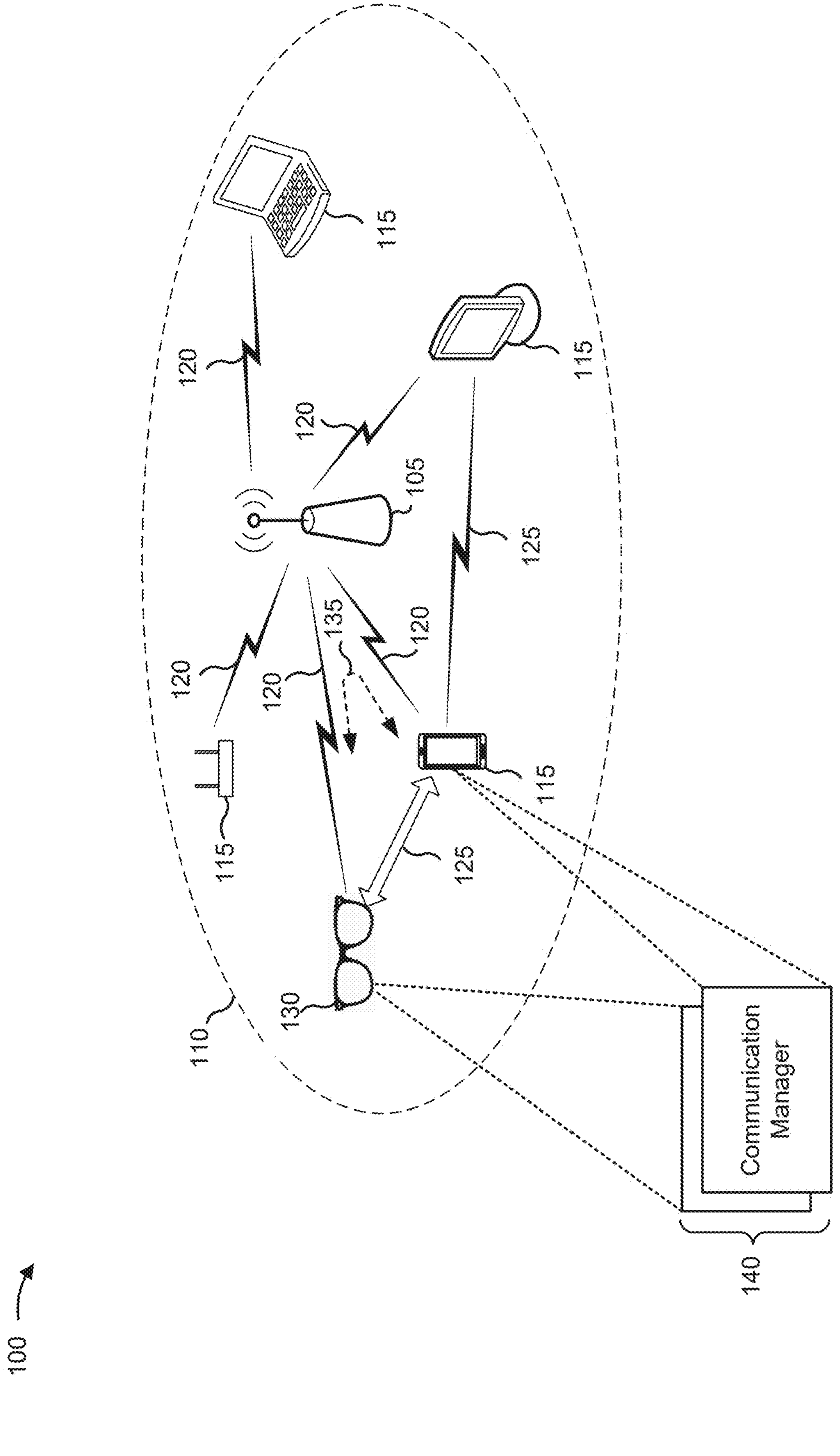
FIG. 1 shows a wireless communication network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Wearable devices, such as extended reality (XR) glasses, are being widely adopted by users to augment user equipments (UEs) or smart phones. Connectivity is crucial for enabling the successful proliferation of the XR glasses. The applications for XR glasses include live video streaming, visual and/or audio-based interactions, immersive augmented reality (AR)/virtual reality (VR) experiences, and first person view capture (video, image, audio).

Apart from latency requirements, the XR glass product line requirements from customers have a high key performance indicator (KPI) target with regard to device power. Users want to use the XR glass for long durations (in days) before the device needs to be recharged. The form factor of the XR glasses necessitates smaller batteries.

Various aspects relate generally to XR data transfers. Some aspects more specifically relate to a wireless device, such as XR glasses, that use a data control action to exchange data in a way that conserves processing resources and power at the wireless device. In some aspects, the data control action may be associated with a real-time application type and involve switching semantic modes to transfer less data. A semantic mode may include a specific way how data is structured and represents other elements. For example, the wireless device may transmit select video images rather than a video stream, textual descriptions of images rather than the images, or textual description of audio rather than the audio.

In some aspects, the wireless device may use connectivity layer/module assisted metrics and feedback to enable power efficient data transfer of non-latency critical data to the companion device. For a non-real-time application type, the wireless device may buffer the data based at least in part on connectivity metrics and transmit the data later based at least in part on connectivity metrics. The wireless device may determine the application data type, monitor the wireless link state, interface between connectivity and application for exchange of processed wireless information, and determine the suitable actions for data exchange.

Particular aspects of the subject matter described in this disclosure can be implemented to realize one or more of the following potential advantages. By using a data control action for real-time or non-real time data transfers, the wireless device may conserve processing resources and power.

Several aspects of wireless communication networks will now be presented with reference to various apparatuses and techniques. These apparatuses and techniques will be described in the following detailed description and illustrated in the accompanying drawings by various blocks, modules, components, circuits, steps, processes, and/or algorithms, among other examples (collectively referred to as “elements”). These elements may be implemented using hardware, software, or combinations thereof. Whether such elements are implemented as hardware or software depends upon the particular application and design constraints imposed on the overall system.

In some wireless communication networks, a wireless communication device (WCD) may support applications associated with low-latency or lossless audio to one or more other devices, such as one or more personal audio devices. For example, a wireless communication device may support applications and use cases associated with ultra-low-latency (ULL), such as ULL gaming, or streaming lossless audio to one or more personal audio devices (for example, peripheral devices) of a user. In scenarios in which a user uses two peripheral devices, the wireless communication device may support an extended personal audio network (XPAN) via which the wireless communication device may communicate with the two peripheral devices. To meet latency or lossless criteria associated with an application or use case, XPAN devices may employ a target wake time (TWT) technique for communication between the wireless communication device and the peripheral devices. In some systems, the peripheral devices and the wireless communication device may exchange one or more Bluetooth (BT) messages and implement a complete TWT teardown between the wireless communication device and each of the peripheral devices. Such an exchange of Bluetooth messages and TWT teardown may introduce too much latency for some applications, such as ULL gaming or streaming lossless audio applications.

In some examples, a wireless communication device (WCD), which may be a handset or an access point (AP) (for example, a soft AP (SAP)), and a set of peripheral devices (for example, earbuds or audio devices) may use downlink audio data packets to carry updated TWT parameters or any other XPAN-related parameters that the wireless communication device and the peripheral devices may indicate via wireless signaling. Additionally, or alternatively, the wireless communication device may embed a set of updated parameters in a padding section of an audio data packet and may transmit the audio data packet to the peripheral devices. The peripheral devices may each acknowledge the audio data packet transmitted by the wireless communication device, and the wireless communication device may communicate in accordance with the updated parameters based on receiving acknowledgements from each of the peripheral devices.

FIG. 1 shows a wireless communication network 100. The wireless communication network 100 may be a wireless local area network (WLAN) or a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bc, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include a central device 105 (e.g., AP, Bluetooth network entity) and multiple associated devices 115 (such as stations (STAs) or SAPs). The devices 115 may include mobile stations, UEs, personal digital assistants (PDAs), other handheld devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors, or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and/or vehicles, among other examples.

The central device 105 and the associated devices 115 (for example, associated STAs) may represent a basic service set (BSS) or an extended service set (ESS). A BSS includes devices that communicate with each other, and an ESS may include multiple BSSs or one or more BSSs and associated wired networks. The various devices 115 in the network are able to communicate with one another through the central device 105. The central device 105 may support a coverage area 110, which may represent a basic service area (BSA) of the wireless communication network 100. An extended network station (not shown) associated with the wireless communication network 100 may be connected to a wired or wireless distribution system that may allow multiple central devices 105 to be connected in an ESS.

While only one central device 105 is shown in FIG. 1, the wireless communication network 100 can include multiple central devices 105. The central device 105 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Although not shown in FIG. 1, a device 115 may be located in the intersection of more than one coverage area 110 and may associated with more than one central device 105. A single AP and an associated set of devices 115 may be referred to as a BSS. A distribution system (not shown) may be used to connect APs in an ESS. In some cases, the coverage area 110 of an AP may be divided into sectors (also not shown). The wireless communication network 100 may include APs of different types (for example, a metropolitan area, or a home network) with varying and/or overlapping coverage areas 110. Two devices 115 may also communicate directly via a direct wireless communication link 125 regardless of whether both devices 115 are in the same coverage area 110. Examples of direct wireless communication links 120 may include Wi-Fi Direct connections, Wi-Fi Tunneled Direct Link Setup (TDLS) links, and other group connections. Devices 115 and APs may communicate according to the WLAN radio and baseband protocol for physical and medium access control (MAC) layers from IEEE 802.11 and versions including 802.11b, 802.11g, 802.11a, 802.11n, 802.11ac, 802.11ad, 802.11ah, and/or 802.11ax, among other examples. In other implementations, peer-to-peer connections or ad hoc networks may be implemented within wireless communication network 100.

In some cases, a device 115 (or an AP) may be detectable by a central AP, but not by other devices 115 in the coverage area 110 of the central AP. For example, one device 115 may be at one end of the coverage area 110 of the central AP while another device 115 may be at the other end. Thus, both devices 115 may communicate with the AP, but may not receive the transmissions of the other. This may result in colliding transmissions for the two devices 115 in a contention-based environment (for example, carrier sense multiple access with collision avoidance (CSMA/CA)) because the devices 115 may not refrain from transmitting on top of each other. A device 115 whose transmissions are not identifiable, but that is within the same coverage area 110 may be known as a hidden node. CSMA/CA may be supplemented by the exchange of a request-to-send (RTS) packet transmitted by a sending device 115 (or AP) and a clear-to-send (CTS) packet transmitted by the receiving device 115 (or AP). This may alert other devices within range of the sender and receiver not to transmit for the duration of the primary transmission. Thus, RTS and/or CTS may help mitigate a hidden node problem.

The wireless communication network 100 may include a central device 105, devices 115 (for example, which may be referred to as source devices or central devices), and paired devices 115 (for example, which may be referred to as sink devices or peripheral devices) implementing WLAN communications (for example, Wi-Fi communications) and/or Bluetooth communications. For example, devices 115 may include cell phones, UEs, STAs, mobile stations, PDAs, other handheld devices, netbooks, notebook computers, tablet computers, laptops, or some other suitable devices. Paired devices 115 may include Bluetooth-enabled devices capable of pairing with other Bluetooth-enabled devices (for example, such as devices 115), which may include wireless audio devices (for example, headsets, earbuds, speakers, earpieces, headphones), display devices (for example, televisions or computer monitors), microphones, meters, and/or valves, among other examples. As one example, the paired devices 115 may include a wearable device (e.g., XR glasses 130) as shown by FIG. 1 (for example, wireless earbuds), and the paired devices 115 may alternatively or additionally communicate with the central device 105. In some aspects, a paired device 115 may communicate with a device 115 using the central device 105.

"Bluetooth communications" may refer to a short-range communication protocol and may be used to connect and exchange information between devices 115 and paired devices 115 (for example, between mobile phones, computers, digital cameras, wireless headsets, speakers, keyboards, mice or other input peripherals, and similar devices). Bluetooth systems (for example, aspects of wireless communication network 100) may be organized using a central-peripheral relationship employing a time-division duplex protocol having, for example, defined time slots of 625 microseconds, in which transmission alternates between the central device (for example, a device 115) and one or more peripheral devices (for example, paired devices 115). In some examples, "device" 115 may generally refer to a central device, and "paired device" 115 may refer to a peripheral device in the wireless communication network 100. Therefore, in some examples, a device may be referred to as either a device 115 or a paired device 115 based on the Bluetooth role configuration of the device. That is, designation of a device as either a device 115 or a paired device 115 may not necessarily indicate a distinction in device capability, but rather may refer to or indicate roles held by the device in the wireless communication network 100. Generally, "device" 115 may refer to a wireless communication device capable of wirelessly exchanging data signals with another device (for example, a paired device 115), and "paired device" 115 may refer to a device operating in a peripheral role, or to a short-range wireless communication device capable of exchanging data signals with the device 115 (for example, using Bluetooth communication protocols).

A communication link 125 may be established between two Bluetooth-enabled devices (for example, between a device 115 and a paired device 115) and may provide for communications or services (for example, according to some Bluetooth profiles). The communication link may use, for example, a Bluetooth LE audio protocol for transferring audio (point-to-point or by broadcast). The controller stack may be responsible for setting up communication links 125, such as asynchronous connection-oriented links (or asynchronous connection-oriented connections), synchronous connection-orientated (SCO) links (or SCO connections), extended synchronous connection-oriented (eSCO) links (or eSCO connections), and/or other logical transport channel links. For example, a Bluetooth connection may be an eSCO connection for voice calls (for example, which may allow for retransmission), and/or an asynchronous connection-less (ACL) connection for music streaming (for example, advanced audio distribution profile (A2DP)), among other examples. eSCO packets may be transmitted in predetermined time slots (for example, 6 Bluetooth slots each for eSCO). The regular interval between the eSCO packets may be specified when the Bluetooth link is established. The eSCO packets to/from a specific device (for example, paired device 115) are acknowledged and may be retransmitted if not acknowledged during a retransmission window. In addition, audio may be streamed between a device 115 and a paired device 115 using an ACL connection (for example, an A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (for example, providing considerably reduced power consumption and cost while maintaining a similar communication range), human interface device (HID) profile (for example, providing low latency links with low power requirements), etc.

A device 115 may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 115 may support WLAN communications via an AP (for example, over communication links 120). The AP and the associated devices 115 may represent a BSS or an ESS. The various devices 115 in the network may be able to communicate with one another through the AP. In some cases the AP may be associated with a coverage area, which may represent a BSA.

Devices 115 and APs may communicate according to the WLAN radio and baseband protocol for physical and MAC layers from IEEE 802.11 and versions including, but not limited to, 802.11b, 802.11g, 802.11a, 802.1In, 802.11ac, 802.11ad, 802.11ah, and/or 802.11ax. In other examples, peer-to-peer connections or ad hoc networks may be implemented within wireless communication network 100, and devices may communicate with each other via communication links 120 (for example, Wi-Fi Direct connections, Wi-Fi TDLS links, peer-to-peer communication links, or other peer or group connections). An AP may be coupled to a network (such as the Internet) and may enable a device 115 to communicate via the network (or communicate with other devices 115 coupled to the AP). A device 115 may communicate with a network device bi-directionally. For example, in a WLAN, a device 115 may communicate with an associated central device 105 via downlink (for example, the communication link from the central device 105 to the device 115) and uplink (for example, the communication link from the device 115 to the central device 105).

In some examples, content, media, and/or audio, among other examples, exchanged between a device 115 and a paired device 115 may originate from a WLAN. In some examples, device 115 may receive audio from a central device 105 (for example, via WLAN communications), and the device 115 may then relay or pass the audio to the paired device 115 (for example, via Bluetooth communications and/or the central device 105). As one example, the device 115 may relay or pass the audio to the paired device 115 via the direct wireless communication link 125. Alternatively, or additionally, the device 115 may relay and/or pass the audio to the paired device via the central device 105 as shown by reference number 135. In some examples, certain types of Bluetooth communications (for example, such as high quality or high definition (HD) Bluetooth) may require enhanced quality of service. For example, in some examples, delay-sensitive Bluetooth traffic may have a higher priority than WLAN traffic.

In some examples, a wireless communication device (for example, the central device 105 and/or a device 115) may support applications associated with low-latency or lossless audio to one or more other devices, such as one or more personal audio devices. For example, a wireless communication device may support applications and use cases associated with ULL, such as ULL gaming, or streaming lossless audio to one or more personal audio devices (for example, peripheral devices) of a user or one or more headset devices (for example, AR/VR/MR/XR headset devices or glasses). In scenarios in which a user uses two or more peripheral devices (for example, earbuds), the wireless communication device may support an XPAN enabling communication with the two or more peripheral devices.

To meet latency or lossless criteria associated with an application or use case, XPAN devices may employ a TWT technique for communication between the wireless communication device and the peripheral devices. Initial or default TWT parameters may be set under an expectation for ideal (for example, interference-free or approximately interference-free) conditions and may be updated in response to changing channel conditions or a changing concurrency situation at the wireless communication device. In some systems, the peripheral devices and the wireless communication device may exchange one or more Bluetooth messages and implement a complete TWT teardown between the wireless communication device and each of the peripheral devices. Such an exchange of Bluetooth messages and TWT teardown may introduce too much latency for some applications, such as ULL gaming or streaming lossless audio applications.

In some examples, a wireless communication device, which may be a device 115 (for example, a handset) or a central device 105, and a set of peripheral devices may use downlink audio data packets to carry updated TWT parameters or any other XPAN-related parameters that the wireless communication device and the peripheral devices may indicate via wireless signaling. In some examples, the wireless communication device may embed a set of updated parameters (for example, updated TWT parameters or other parameters associated with the XPAN) in one or more fields, such as one or more contributing source (CSRC) fields, of a real-time transport protocol (RTP) audio header of an audio data packet and may transmit the audio data packet to the peripheral devices. Additionally, or alternatively, the wireless communication device may embed a set of updated parameters in a padding section of an audio data packet and may transmit the audio data packet to the peripheral devices. The peripheral devices may each acknowledge the audio data packet transmitted by the wireless communication device and the wireless communication device may communicate in accordance with the updated parameters based on receiving acknowledgements from each of the peripheral devices.

In accordance with the example implementations described herein, various devices may use over-the-air transmissions to indicate updated parameters (for example, updated XPAN-related parameters, such as updated TWT parameters) via one or both of RTP audio header CSRC fields or padding fields in a payload data section. Consequently, the various devices may use a sequence of over-the-air packet transmissions to change or update a set of parameters (for example, a set of TWT parameters). For example, via audio data packet transmissions, the various devices may configure, trigger, or indicate an increase or a decrease in audio packet periodicity (for example, when TWT service interval (SI) is changed). Further, in accordance with the described techniques, such devices may avoid an explicit TWT teardown, request, and response frame exchange and may instead achieve a TWT sequence change after RTP audio header CSRC fields or a padding section indicates updated TWT parameters.

Some aspects and techniques as described herein may be implemented, at least in part, using an artificial intelligence (AI) program (for example, referred to herein as an "AI/ML model"), such as a program that includes a machine learning (ML) model and/or an artificial neural network (ANN) model. The AI/ML model may be deployed at one or more devices (for example, one or more devices 115, central devices 105, and/or one or more servers, and/or one or more components of a cloud computing network, among other examples). For example, in an deployment where AI/ML functionality is performed independently at a device, sometimes referred to as "overlay AI/ML", the AI/ML model (or an instance or portion of the AI/ML model) may be deployed at a device, one or more servers, and/or one or more components of a cloud computing network, among other examples. Additionally or alternatively, in a deployment where AI/ML functionality is coordinated between different devices, sometimes referred to as "coordinated AI/ML", or performed at all device and network layers, sometimes referred to as "native AI/ML", the AI/MVL model (or an instance of the AI/ML model) may be deployed at multiple devices (for example, a first portion of the AI/ML model may be deployed at a central device 105 and a second portion of the AI/ML model may be deployed at a network entity). In other examples of coordinated AI/ML and/or native AI/ML, a first AI/ML model may be deployed at a central device 105 and a second AI/ML model may be deployed at a network entity. The AI/ML model(s) may be configured to enhance various aspects of the wireless communication network (for example, to increase privacy, reliability, and/or efficient use of network bandwidth, and/or to reduce latency, among other examples). For example, the AI/ML model(s) may be trained to identify patterns or relationships in data corresponding to the wireless communication network, a device, and/or an air interface, among other examples. The AI/ML model(s) may support operational decisions relating to one or more aspects associated with wireless communications devices, networks, or services.

Accordingly, in some examples, the AI/ML model(s) may enable AI-as-a-Service (for example, an end-to-end AI/ML service via a user plane) for use cases such as a self-organizing network (SON), minimization of drive test (MDT), quality of experience (QoE), positioning, sensing, predictive mobility, and/or traffic prediction, among other examples. In some examples, AI-as-a-Service use cases may include measurement collection reporting by a central device or a peripheral device, device selection criteria (for example, according to a geographical area where measurements are to be collected and/or UE capabilities to be used to collected measurements), and/or reporting configurations (for example, reporting parameters such as location, time, and/or sensor information, among other examples). Additionally or alternatively, the AI/ML model(s) may enable AI/ML procedures (for example, RAN-triggered service establishment, configuration, inferencing using UE-side and/or network-side models, performance monitoring and/or management, and/or capability signaling, among other examples). Additionally or alternatively, the AI/ML model (s) may enable RAN-based AI/ML services via one or more application program interfaces (APIs) and/or management interfaces for use cases such as beam management, radio resource monitoring (RRM) relaxation, mobility prediction, load prediction, network energy savings, and/or coverage and capacity improvements, among other examples.

In some aspects, a wireless device (e.g., wearable device, XR glasses 130, XR headset) may include a communication manager 140. As described in more detail elsewhere herein, the communication manager 140 may identify a trigger for a transfer of data on a wireless link that is associated with extended reality; and exchange the data on the wireless link using a data control action that is based at least in part on an application type of the transfer, wherein the application type is real-time streaming or non-real-time streaming. Additionally, or alternatively, the communication manager 140 may perform one or more other operations described herein.

Figure 2:
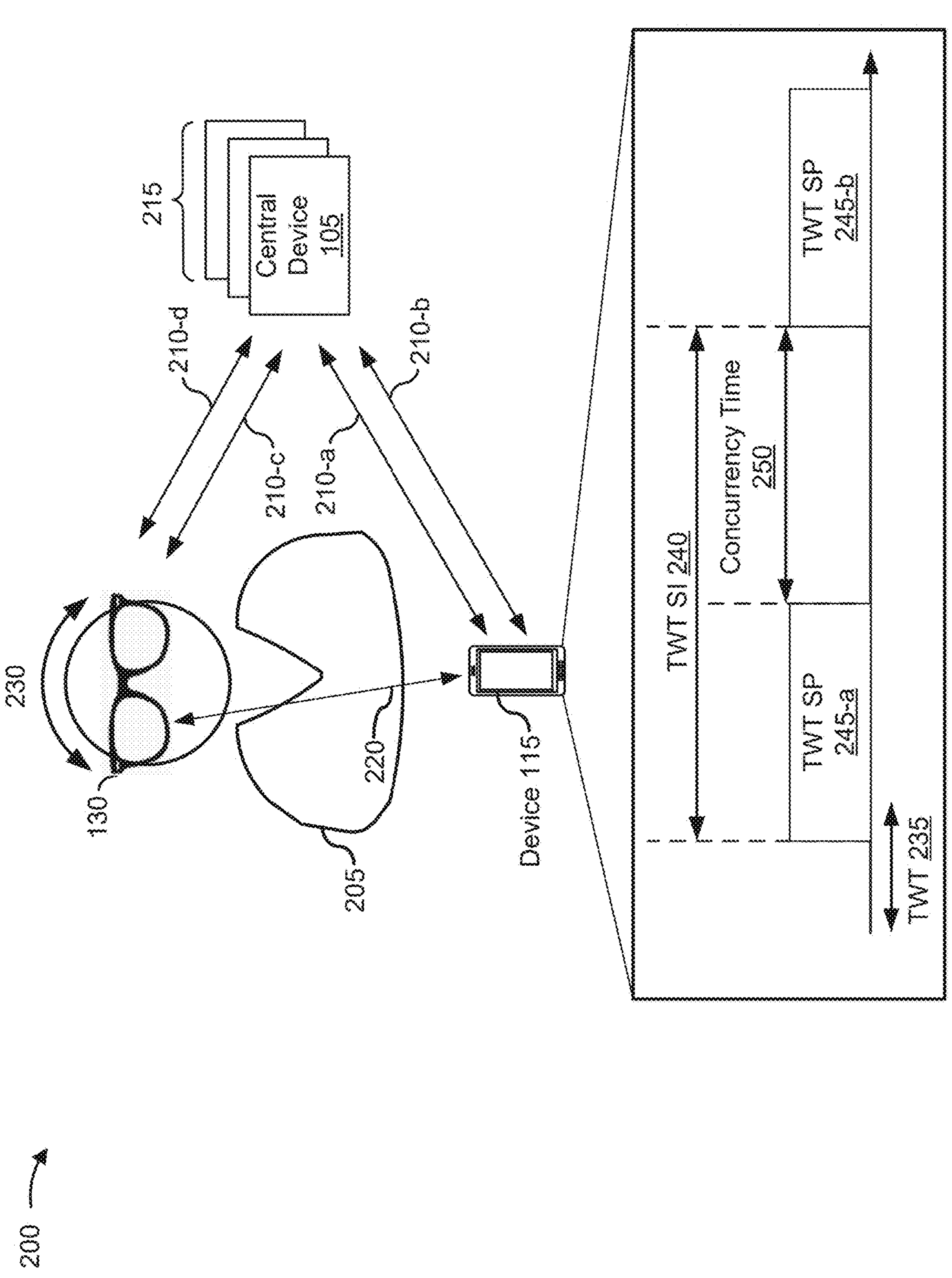
FIG. 2 illustrates an example of a wireless communication network that supports low-latency parameter updates for extended personal audio network.

FIG. 2 illustrates an example of a wireless communication network 200 that supports low-latency parameter updates for extended personal audio networks in accordance with the present disclosure. The wireless communication network 200 may implement or be implemented to realize aspects of the wireless communication network 100. For example, the wireless communication network 200 illustrates communication between a central device 105, a device 115 (for example, a handset or handheld device), and XR glasses 130 of a user 205 (for example, examples of audio devices and/or peripheral devices), which may be examples of corresponding devices as illustrated by and described with reference to FIG. 1. In some examples, the device 115, the XR glasses 130 may support a signaling-based mechanism according to which the device 115 may transmit an indication of a set of updated parameters to the XR glasses 130.

In some examples, the device 115 may communicate with the central device 105 via one or more links 120, which may be examples of infrastructure links between the central device 105 and the device 115. Alternatively, or additionally, the central device 105 may communicate with the XR glasses 130 via the wireless link 120, respectively. In some examples, the XR glasses 130 may be connected to a same central device 105 as the device 115. In other aspects, the XR glasses 130 may be connected to a different central device 105 than the device 115. Accordingly, and as shown by reference number 215, the device 115, the XR glasses 130 may communicate with one another via multiple APs. The link 210-*a* may be an example of a 2.4 GHz link between the central device 105 and the device 115, and the link 210-*b* may be an example of a 5 GHz link or a 6 GHz link between the central device 105 and the device 115. In some examples, the link 210-*c* and/or the link 210-*d* may be a 2.4 GHz link, a 5 GHz, and/or a 6 GHz link.

The device 115 may communicate wirelessly with the XR glasses, which may be associated with an XPAN of the device 115. For example, the device 115 may communicate with the XR glasses 130 via a link 220, where the link 220 may be referred to or understood as XPAN links. The link 220 may be an example of a 5 GHz link or a 6 GHz link.

The device 115 may communicate with the XR glasses 130 via one or more central devices 105. To illustrate, the device 115 may communicate with a first central device 105 via the link 210-*a* and/or the link 210-*b*. The first central device 105 may be connected to a second central device 105, and the second central device 105 may be connected to the XR glasses 130 via the link 210-*c* and/or the link 210-*d*. Accordingly, the device 115 may communicate with the XR glasses 130 based at least in part on communicating with the first central device 105, the first central device 105 communicating with the second central device 105, and the second central device 105 communicating with the XR glasses 130. However, in other examples, the device 115, the XR glasses 130 may be connected to a same central device 105.

In some examples, the device 115, the XR glasses 130 may support or belong to an XPAN and may use the XPAN to support one or more applications or use cases, such as applications or use cases associated with latency or lossless audio constraints or criteria. For example, the device 115 may support one or more use cases of ULL gaming and streaming lossless audio to the XR glasses 130 (for example, personal devices of the device 115). For such applications, the device 115 may be expected to keep end-to-end latency below a relatively stringent latency target (for example, 40 milliseconds (ms) for ULL gaming). Further, the device 115 may also be tasked with handling (for example, gracefully handling without a hard disconnect and/or loss of data) a coexistence of XPAN traffic (for example, traffic to or from one or both of the XR glasses 130) with other concurrency scenarios the user 205 or the system may initiate. Such other concurrency scenarios may include a scan concurrency for channel selection, STA infrastructure link concurrency for online gaming or other traffic to or from the central device 105, or neighbor aware networking (NAN) discovery and NAN data transfer, or any combination thereof.

The device 115 may have an operating condition and/or an operating specification to meet, such as a data transfer latency operating condition for various applications or use cases (for example, an ultra-low-latency constraint for a ULL gaming use case) and also facilitate coexistence between XPAN and other concurrency scenarios on the device 115. To meet the latency operating condition associated with, for example, ULL gaming, a power constraint of the XR glasses 130, and/or power and concurrency constraints at the device 115, the device 115 may employ a TWT technique for the communication between the device 115 (which may act or function as an SAP) and each of the XR glasses 130 (which may act or function as STAs). Alternatively, or additionally, the device 115 may employ one or more power saving mode time synchronization techniques as described below.

Example TWT parameters include a TWT 235, a TWT SI 240, and a TWT service period (SP) 245. A TWT 235 may indicate or be associated with a timing synchronization function (TSF) time indicating a start or beginning of a first TWT session. A TWT SI 240 may indicate a TWT interval, which may refer to a time difference between a start or beginning of two consecutive TWT sessions. A TWT SP 245 may indicate a duration during which one or both of the XR glasses 130 are awake during a TWT SI 240. In some aspects, a TWT SP 245 may be referred to or understood as a TWT session. As illustrated by FIG. 2, the TWT SI 240 may indicate a time difference between a TWT SP 245-*a* and a TWT 245-*b*. A remainder of time within a TWT SI 240 excluding a TWT SP 245 may be referred to or understood as a concurrency time 250 during which the device 115 may perform any operations (for example, transmission or reception) associated with a concurrency scenario at the device 115. In other words, the difference between XPAN TWT SI 240 and XPAN TWT SP 245 may be the time left for the device 115 to support other concurrencies (for example, outside of any channel switching or software overheads).

For XPAN, each of the XR glasses 130 (which may be examples of TWT requesting STAs) may initiate a TWT session with the device 115 (which may be an example of a TWT responding STA). Further, for low-latency use cases (for example, ULL gaming use cases), a target end-to-end latency may be relatively stringent (for example, less than or equal to approximately 40 ms), which may be tied to, associated with, or expect a Wi-Fi latency in a specific range (for example, in the sub-10 ms range). To achieve such a Wi-Fi latency, a TWT SI 240 and a TWT SP 245 may be selected or set to specific values (for example, a TWT SI 240 may be set to 4 ms with a TWT SP 245 of 2 ms). Further, for a lossless audio use case, for example, a TWT SI 240 may be set to approximately 70 ms with a TWT SP 245 of approximately 23 ms.

Figure 3:
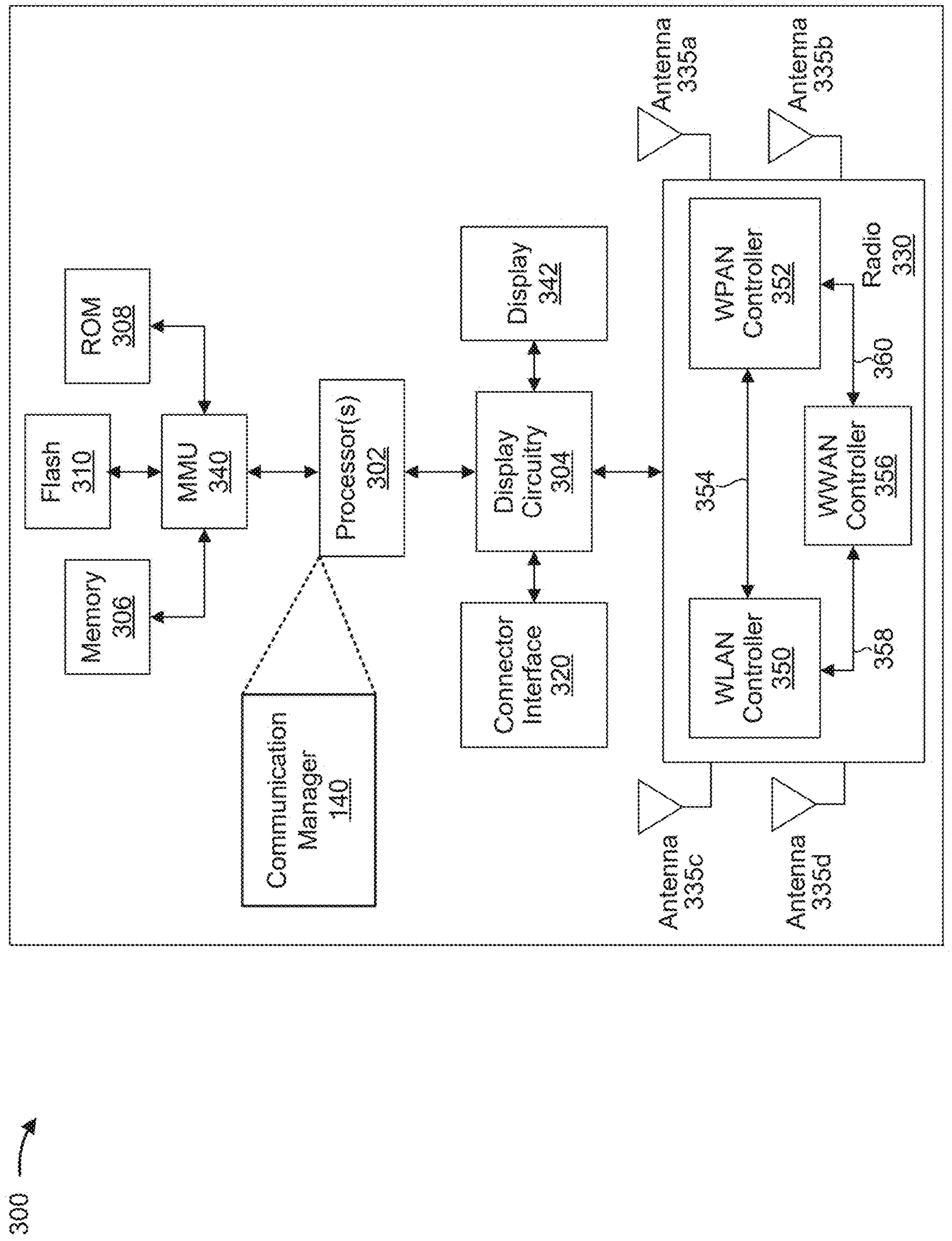
FIG. 3 is a diagram illustrating an example of a wireless communication device.

FIG. 3 is a diagram illustrating an example of a wireless communication device 300. In some aspects, the wireless communication device 300 may be an example of the central device 105, the device 115, and/or the XR glasses 130 described above. In some examples, the central device 105, the device 115, and/or the XR glasses 130 may include one or more wireless communication devices 300 and/or one or more components of wireless communication device 300.

Figure 16:
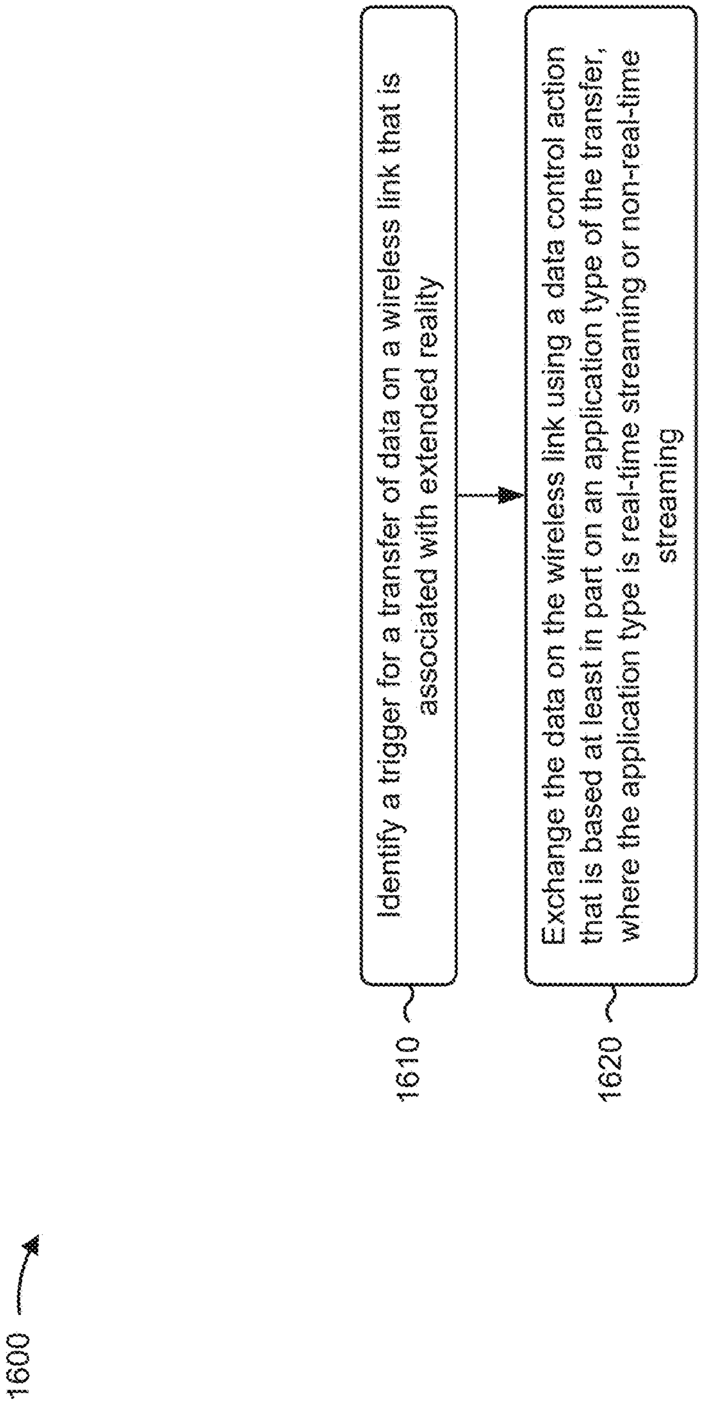
FIG. 16 is a diagram illustrating an example process performed, for example, at a wireless device or an apparatus of a wireless device.

In some examples, the wireless communication device 300 is configured to perform process 1600 of FIG. 16, or other processes as described herein. The wireless communication device 300 may include one or more chips, system-on-chips (SoCs), chipsets, packages, components or devices that individually or collectively constitute or comprise a processing system. The processing system may interface with other components of the wireless communication device 300, and may generally process information (such as inputs or signals) received from such other components and output information (such as outputs or signals) to such other components. In some examples, an example chip may include a processing system, a first interface to output or transmit information and a second interface to receive or obtain information. For example, the first interface may refer to an interface between the processing system of the chip and a transmission component, such that the wireless communication device 300 may transmit the information output from the chip. In such an example, the second interface may refer to an interface between the processing system of the chip and a reception component, such that the wireless communication device 300 may receive information that is passed to the processing system. In some such examples, the first interface also may obtain information, such as from the transmission component, and the second interface also may output information, such as to the reception component.

As shown in FIG. 3, the wireless communication device 300 may include processor (or "processing") circuitry in the form of one or multiple processors, such as processor(s) 302. The processor (or "processing") circuitry may be in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processor(s) 302 may execute program instructions for the wireless communication device 300. One or more of the processor(s) 302 may be individually or collectively configurable or configured to perform various functions or operations described herein. A group of processor(s) 302 collectively configurable or configured to perform a set of functions may include a first processor configurable or configured to perform a first function of the set and a second processor configurable or configured to perform a second function of the set, or may include the group of processors all being configured or configurable to perform the set of functions.

The wireless communication device 300 may also include a display 342 that can perform graphics processing and present information to a user. The processor(s) 302 may also be coupled to memory management unit (MMU) 340, which may be configured to receive addresses from the processor (s) 302 and translate the addresses to address locations in memory such as memory 306, read-only memory (ROM) 308, or flash memory 310 and/or to address locations in other circuits or devices, such as the display circuitry 304, radio 330, connector interface 320, and/or display 342. The MMU 340 may also be configured to perform memory protection and page table translation or set up. In some aspects, the MMU 340 may be included as a portion of the processor(s) 302. In some aspects, the wireless communication device 300 may include a communication manager (for example, communication manager 140) that controls the wireless communication device 300 or processor(s) 302 to perform the processes described herein.

In some examples, the processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"), such as the memory 306, ROM 308, and/or flash memory 310. One or more of the memories may be coupled with one or more of the processors and may individually or collectively store processor-executable code that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

The processor(s) 302 may be coupled to other circuits of the wireless communication device 300. For example, the wireless communication device 300 may include various memory types, a connector interface 320 through which the wireless communication device 300 can communicate with the computer system, and wireless communication subsystems that can transmit data to, and receive data from, other devices based on one or more wireless communication standards or protocols. For example, in some aspects, the wireless communication subsystems may include (but are not limited to) a WLAN subsystem, a WPAN subsystem, and/or a cellular subsystem (such as a Long-Term Evolution (LTE) or New Radio (NR) subsystem). The wireless communication device 300 may include multiple antennas 335*a*, 335*b*, 335*c*, and/or 335*d* for performing wireless communication with, for example, wireless communication devices in a WPAN.

The wireless communication device 300 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as a field-programmable gate array (FPGA), and/or an application specific integrated circuit (ASIC).

In certain aspects, the radio 330 may include separate controllers configured to control communications for various respective radio access technology (RAT) protocols. For example, as shown in FIG. 3, radio 330 may include a WLAN controller 350 that manages WLAN communications, a WPAN controller 352 that manages Bluetooth, BLE, and/or other suitable WPAN communications, and a wireless wide area network (WWAN) controller 356 that manages WWAN communications. In some aspects, the wireless communication device 300 may store and execute a WLAN software driver for controlling WLAN operations performed by the WLAN controller 350, a WPAN software driver for controlling WPAN operations performed by the WPAN controller 352, and/or a WWAN software driver for controlling WWAN operations performed by the WWAN controller 356.

In some aspects, a first coexistence interface 354 (such as a wired interface) may be used for sending information between the WLAN controller 350 and the WPAN controller 352. Additionally, or alternatively, in some aspects, a second coexistence interface 358 may be used for sending information between the WLAN controller 350 and the WWAN controller 356. Additionally, or alternatively, in some aspects, a third coexistence interface 360 may be used for sending information between the WPAN controller 352 and the WWAN controller 356. In some examples, one or more of the WLAN controller 350, the WPAN controller 352, and/or the WWAN controller 356 may be implemented as hardware, software, firmware or some combination thereof.

In some aspects, the WLAN controller 350 may be configured to communicate with a second device in a WPAN using a WLAN link using one or more, some, or all of the antennas 335*a*, 335*b*, 335*c*, and 335*d*. In other configurations, the WPAN controller 352 may be configured to communicate with at least one second device in a WPAN using one or more, some, or all of the antennas 335*a*, 335*b*, 335*c*, and 335*d*. In other configurations, the WWAN controller 356 may be configured to communicate with a second device in a WPAN using one or more, some, or all of the antennas 335*a*, 335*b*, 335*c*, and 335*d*. The WLAN controller 350, the WPAN controller 352, and/or the WWAN controller 356 may be configured to adjust a wakeup time interval and a shutdown time for the wireless communication device 300.

A short-range wireless communications protocol, such as BT, BLE, and/or BR/EDR, may include and/or may use one or more other communications protocols, for example, to establish and maintain communications links. In some examples, the wireless communication device 300 may establish a communications link with one or more peripheral devices, such as a wireless headset or wireless earbuds, according to at least one communications protocol for short-range wireless communications. In some aspects, the communications link may include a communications link that adheres to a protocol included and/or for use with BT, BLE, and/or BR/EDR, among other examples. In one aspect, the communications link may include an asynchronous connection-oriented logical transport, sometimes referred to as an ACL link. When operating as an ACL link, the communications link may allow the wireless communication device 300 to connect or "pair" with a peripheral device. The connection is asynchronous in that the two devices may not need to synchronize, timewise, data communications between each other to permit communication of data packets via the communications link.

In some examples, a logical link control and adaptation protocol (L2CAP) may be used within a BT protocol stack (not shown in FIG. 3). An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In some examples, the communications link may include an A2DP link. For example, an A2DP link may provide a point-to-point link between a source device, such as the wireless communication device 300, and a sink device, such as the XR glasses 130. With an A2DP link, data packets including audio may be transmitted over an ACL channel, and other information (for example, for controlling the audio stream) may be transmitted over a separate control channel. The data packets may occur non-periodically.

In some examples, the communications link may support synchronous logical transport mechanisms between a source device and a peripheral device. For example, a communications link may include an SCO link that provides a symmetric point-to-point link between the source device and the peripheral device using time slots reserved for BT communications. In some aspects, an SCO link may not support retransmission of data packets, which may be unsatisfactory in audio streaming and/or voice call use cases in which a dropped audio or voice packet may reduce the quality of the user experience. Accordingly, in some aspects, the communications link may include an eSCO link. An eSCO link may provide a symmetric or asymmetric point-to-point link between a source device and a peripheral device using time slots reserved for BT communications, and may also provide for a retransmission window following the reserved time slots. Because retransmissions may be facilitated using the retransmission window, an eSCO link may be suitable for audio streaming and/or voice call use cases because a dropped audio or voice packet may be retransmitted, and therefore the probability of successfully receiving a data packet may be increased.

In some aspects, the communications link may include an isochronous (ISO) link. When operating as an ISO link, the communications link may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped, and the receiving device may continue to receive the stream without data from the dropped data packet.

In some aspects, a wireless device (e.g., wearable device, XR glasses 130, XR headset) includes means for identifying a trigger for a transfer of data on a wireless link that is associated with extended reality; and/or means for exchanging the data on the wireless link using a data control action that is based at least in part on an application type of the transfer, where the application type is real-time streaming or non-real-time streaming. In some aspects, the means for the wireless communication device 300 to perform operations described herein may include, for example, one or more of antennas 335*a*-335*d*, WPAN controller 352, WLAN controller 350, radio 330, and/or processor 302, among other examples.

The number and arrangement of components shown in FIG. 3 are provided as an example. In practice, device 300 may include additional components, fewer components, different components, or differently arranged components than those shown in FIG. 3. Additionally, or alternatively, a set of components (for example, one or more components) of device 300 may perform one or more functions described as being performed by another set of components of device 300.

Figure 4:
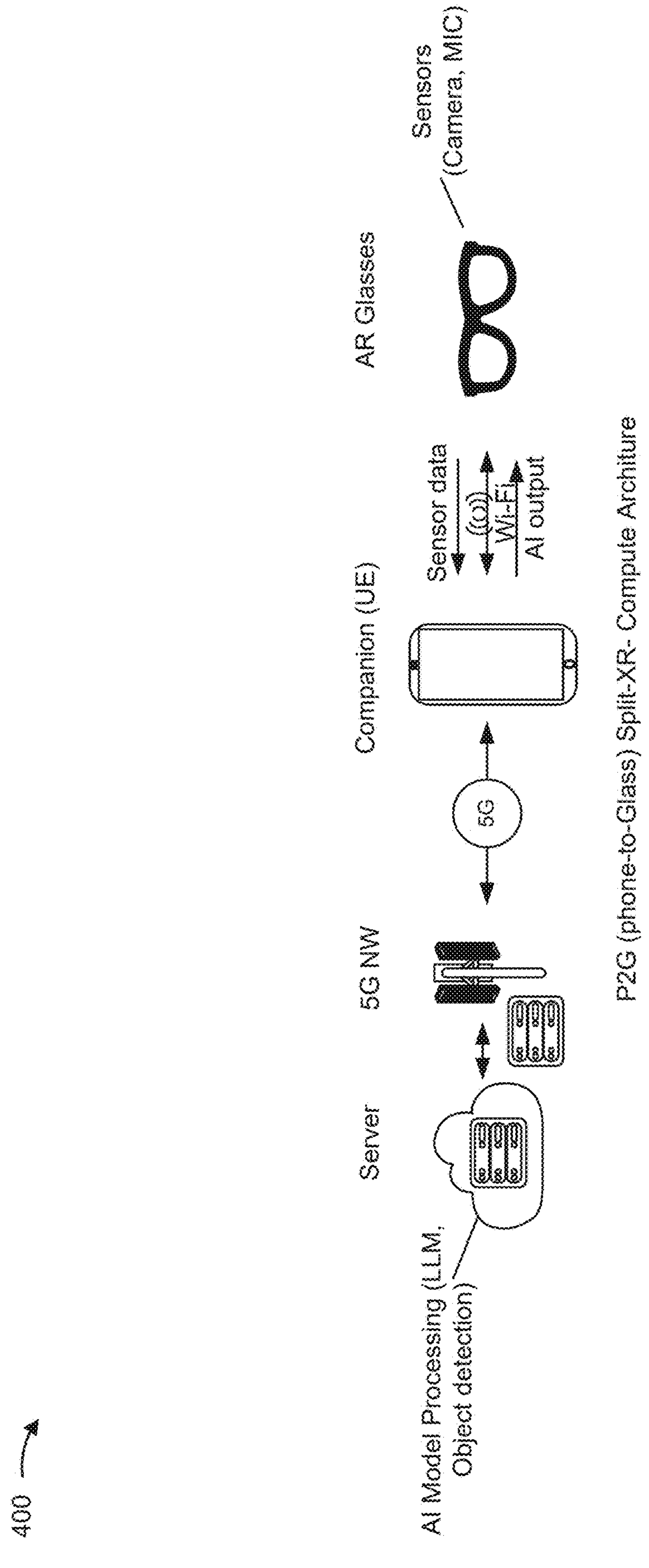
FIG. 4 is a diagram illustrating an example of peripheral connections.

FIG. 4 is a diagram illustrating an example 400 of peripheral connections.

Wearable devices, including earbuds or XR glasses (e.g., smart glasses, AR glasses), may be commercialized and may be enabled over 5G and Wi-Fi links. Machine learning (ML)//artificial intelligence (AI) services require heavy AI processing at the server or a peripheral or companion device (e.g., immersive XR, large language models (LLMs), object detection). Therefore, the related sensor information (camera, microphone) is to be delivered from XR glasses to the server or the peripheral/companion over 5G/Wi-Fi links. For example, the information may provide the user environments for immersive XR (camera→video stream→server) and XR AI (e.g., multi-modal AI (MMAI)) (voice→audio stream→server). However, 5G and Wi-Fi connections are not always able to provide the sufficient data rate and reliability to support the raw semantic data needed for AI processing. For example, uplink camera video streaming may experience Wi-Fi congestion or 5G cell edge devices may experience service interruption.

XR glasses, for example, may be widely adopted by users to augment UEs or smart phones. WLAN, BT, or equivalent connectivity is crucial for enabling the successful proliferation of the XR glasses. The application use cases for XR glasses include live video streaming, visual and/or audio-based interactions (e.g., "What am I looking at?"), immersive AR/VR experiences, and first person view capture (video, image, audio).

Apart from latency requirements, the XR glass product line requirements from customers have a high key performance indicator (KPI) target with regard to device power. Users want to use the XR glass for long durations (in days) before the device needs to be recharged. The form factor of the XR glasses necessitates smaller batteries.

As indicated above, FIG. 4 is provided as an example. Other examples may differ from what is described with regard to FIG. 4.

Figure 5:
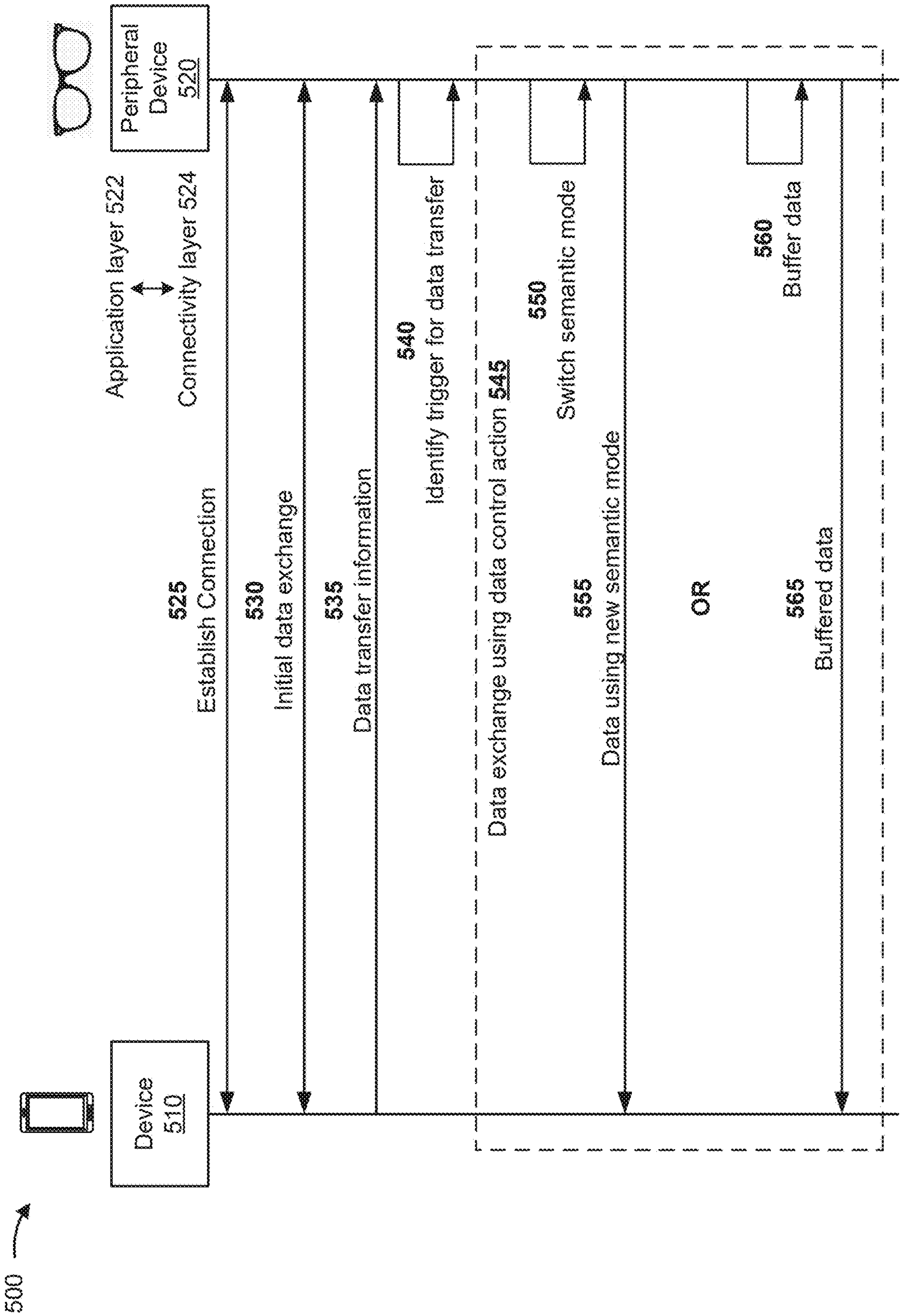
FIG. 5 is a diagram illustrating an example associated with exchanging data using a data control action.

FIG. 5 is a diagram illustrating an example 500 associated with exchanging data using a data control action. As shown in FIG. 5, a device 510 (e.g., device 115, a UE, a companion device) and a peripheral device 520 (e.g., XR glasses 130, wearable device) may communicate with one another.

According to various aspects described herein, a wireless device, such as the peripheral device 520, may use a data control action to exchange data in a way that conserves processing resources and power at the peripheral device 520. In some aspects, the data control action may be associated with a real-time application type and involve switching semantic modes to transfer less data. A semantic mode may include a specific way how data is structured and represents other elements. For example, the peripheral device 520 may transmit select video images rather than a video stream, textual descriptions of images rather than the images, or textual description of audio rather than the audio. As a result, the peripheral device 520 may conserve processing resources and power.

In some aspects, the peripheral device 520 may use connectivity layer/module assisted metrics and process feedback to enable power efficient data transfer of non-latency critical data to the companion device. For a non-real-time application type, the peripheral device 520 may buffer the data based at least in part on connectivity metrics and transmit the data later based at least in part on connectivity metrics. The peripheral device 520 may determine the application data type, monitor the wireless link state, interface between connectivity and application for exchange of processed wireless information, and determine the suitable actions for data exchange. As a result, the peripheral device 520 may conserve power by not wasting processing resources and signal resources on data transmissions that may fail.

Example 500 shows the use of a data control action to exchange data in order to conserve resources and power.

As shown by reference number 525, the device 510 and the peripheral device 520 may establish a connection, as shown by reference number 530, the devices may have an initial data exchange. In some aspects, as shown by reference number 535, the device 510 may transmit data transfer information associated with a data control action for exchanging data in a way that conserves power and resources.

As shown by reference number 540, the peripheral device 520 may identify a trigger for a data transfer. The peripheral device 520 may provide connectivity metrics from a connectivity layer 524 to an application layer 522. The application layer 522 may determine to use a data control action to exchange data, as shown by reference number 545.

In some aspects, the data control action may be for real-time data, and the peripheral device 520 may dynamically switch form a first semantic mode to a second semantic node, as shown by reference number 550. As shown by reference number 555, the peripheral device may use the second semantic mode to transmit data.

Alternatively, for non-real-time data, the peripheral device 520 may buffer data, as shown by reference number 560. As shown by reference number 565, the peripheral device 520 may transmit the buffered data. This may be at a later time that is based at least in part on feedback from metrics or a triggered event.

In an example, the peripheral device 520 may include XR glasses, and the XR glasses may record a video of a family event. The XR glasses may prepare to transfer the data to a companion device (e.g., device 115) or beyond to the cloud. The XR glasses may transfer the data based at least in part on a connectivity metric, such as a strength of a wireless link between devices (e.g., line-of-sight (LOS) or non-line of sight (NLOS)). If there is channel interference on the wireless link, attempting the data transfer on the wireless link when the wireless conditions are not favorable (connectivity metrics such as high congestion, low receive signal strength indicator (RSSI), low signal-to-noise ratio (SNR), transfer time, latency, power) leads to a greater transfer duration and lower modulation and coding scheme (MCS). Connectivity metrics may be statistically reported as a mean or a tail percentile over a monitoring window (to identify how close or how far the XR glass is from the companion device (e.g., smartphone)). The greater the duration, the higher the power consumption. The higher the power consumption and the lower the MCS, the poorer the user experience. The XR glasses may proceed with or postpone the data transfer based at least in part on the connectivity metrics. The XR glasses may transfer that data when conditions are better (less interference, higher received signal strength, higher MCS).

Connectivity metrics for a link may include channel availability or channel loading on the wireless medium. For instance, the metric may be represented as a fraction of a medium that is available for performing data transfer to the companion device. This may be monitored and measured over a time window. A connectivity matric may include a transmission rate code and configuration (e.g., synchronization signal, bandwidth). This is a measure of the achievable data throughput for the devices on the current link. The XR glasses may monitor the transmission chain, the bandwidth, and the MCS over the time window. A wireless connectivity layer/module based on the connectivity metrics may provide the metric feedback to the application layer 522 for an incoming request on the data transfer, including the time taken for transfer and power utilization. The estimates may be used to determine the decision to perform a dynamic semantic mode switch or a buffered data transmission.

The XR glasses may make a data transmission determination based at least in part on connectivity feedback. Connectivity feedback between the layers (e.g., from the connectivity layer to the application layer) may include an estimate of the time required to transfer and a power utilization estimate. The XR glasses may, based at least in part on the connectivity metric or feedback for the connectivity metric, display a notification about the data transfer or power utilization for a user of the XR glasses. The application may determine to initiate transmission currently or postpone a data transmission for later. The XR glasses may display a suggested action to the user, such as to postpone non-real time streaming or to move the XR glasses closer to a smartphone or AP. The XR glasses may display navigational assistance for a user (e.g., LOS or NLOS guidance). In some aspects, the connectivity metric or the feedback may inform device configuration decisions (e.g., utilize lower antenna, bandwidth) and application decisions (e.g., small chunk packetization, application rate adaptations).

Example 500 shows how wearable devices and any companion device or server may enhance the battery life of the wearable devices by optimizing the wireless channel access attempt for data transfer. The use of the data control function may provide application experience improvements that are guided by wireless connectivity (e.g., data transmission decision, user notification and other optimizations). As a result, the overall user smart glass experience is improved by efficient battery usage and data traffic shaping (e.g. reducing the require data rate). Enabling dynamic semantic modal switching for split XR computing increases the reliability of AI services.

As indicated above, FIG. 5 is provided as an example. Other examples may differ from what is described with respect to FIG. 5.

Figure 6:
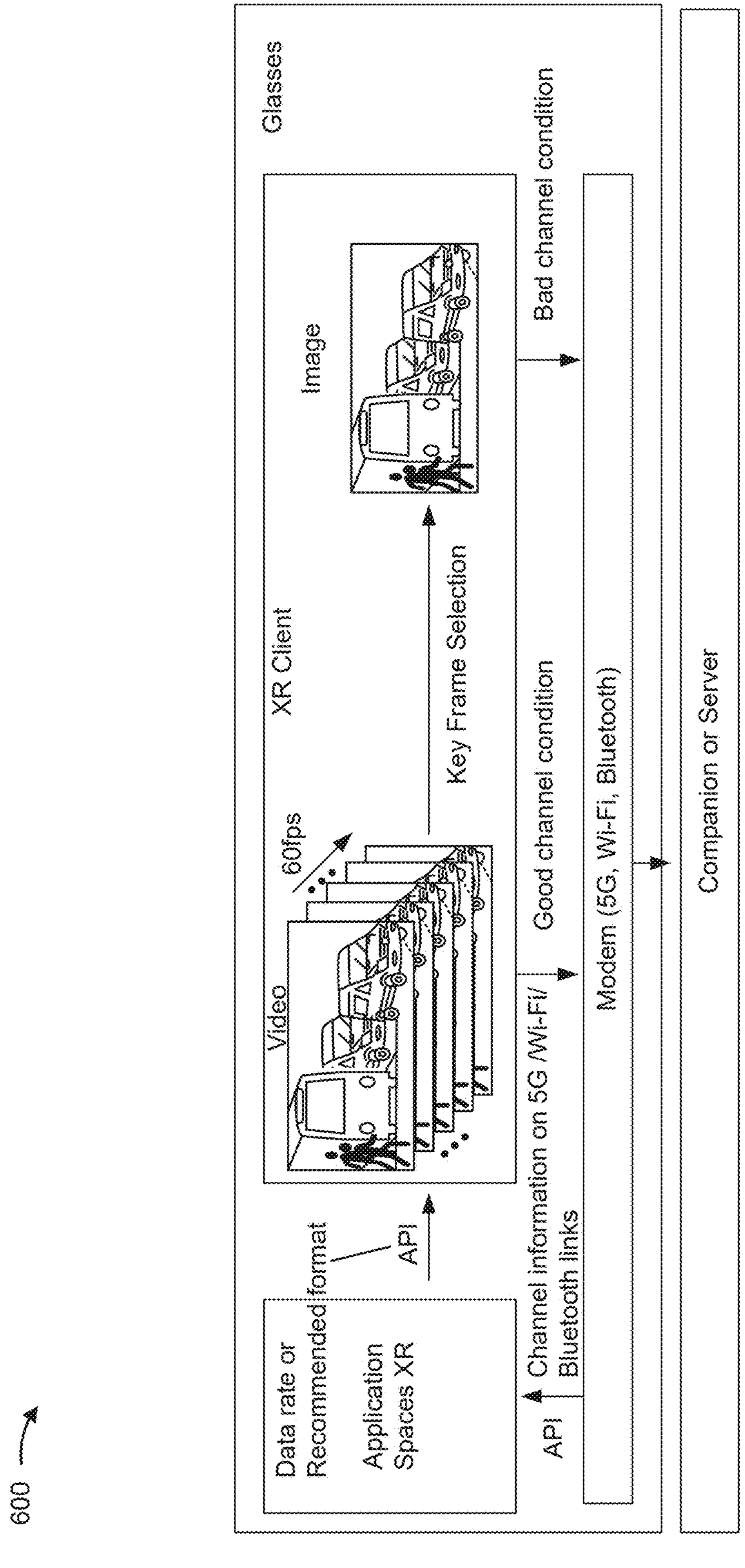
FIG. 6 is a diagram illustrating an example of a semantic mode switch for video.

FIG. 6 is a diagram illustrating an example 600 of a semantic mode switch for video.

In some aspects, if a wireless link condition (e.g., 5G condition, Wi-Fi condition, Bluetooth condition) is not sufficient to support the original multi-modal semantic format, the XR glasses may translate the format to a simpler semantic with a lower data rate. For example, camera video streaming (video) may be switched to key frame selection (image). A camera still image may be translated to a textual description of the image with object detection or object tracking. A voice conversation (audio) may be translated to a textual description of the audio or characteristics of the audio. The XR glasses may mark the semantic mode format on the uplink traffic, and the server or companion device may conduct the ML/AI processing with the provided format. Inside the XR glasses, the XR client may work with the modem to adapt the semantic mode to the dynamic link conditions.

The companion device or server may provide (e.g., via an application space) an indication of a supported or recommend data format (e.g., video, image for object detection), decision criteria (e.g., data rate threshold) and/or on-device AI/ML model to the glasses (see the data transfer information of reference number 535 in FIG. 5 or the application programming interface (API) in FIG. 6). Also, the companion device or server may provide some metadata information to help the semantic modal switching at glasses. The modem may provide channel information for the link to the application space.

Example 600 shows key frame selection to provide a key image from a stream of video frames. In good link (channel) conditions the semantic mode is video. In bad link (channel) conditions, the semantic mode is a key image.

In an example, the application space XR may provide channel information to XR client. If the channel conditions for the link are not sufficient, the XR client may run a key frame selection algorithm and sends a few selected image frames to companion device or server. The number of image frames depends on the channel conditions.

The companion device or server may request a specific frame or provide the criteria for key frame selection to the XR glasses. The XR glasses may have an on-device AI/ML model or an algorithm for key frame selection.

As indicated above, FIG. 6 is provided as an example. Other examples may differ from what is described with regard to FIG. 6.

Figure 7:
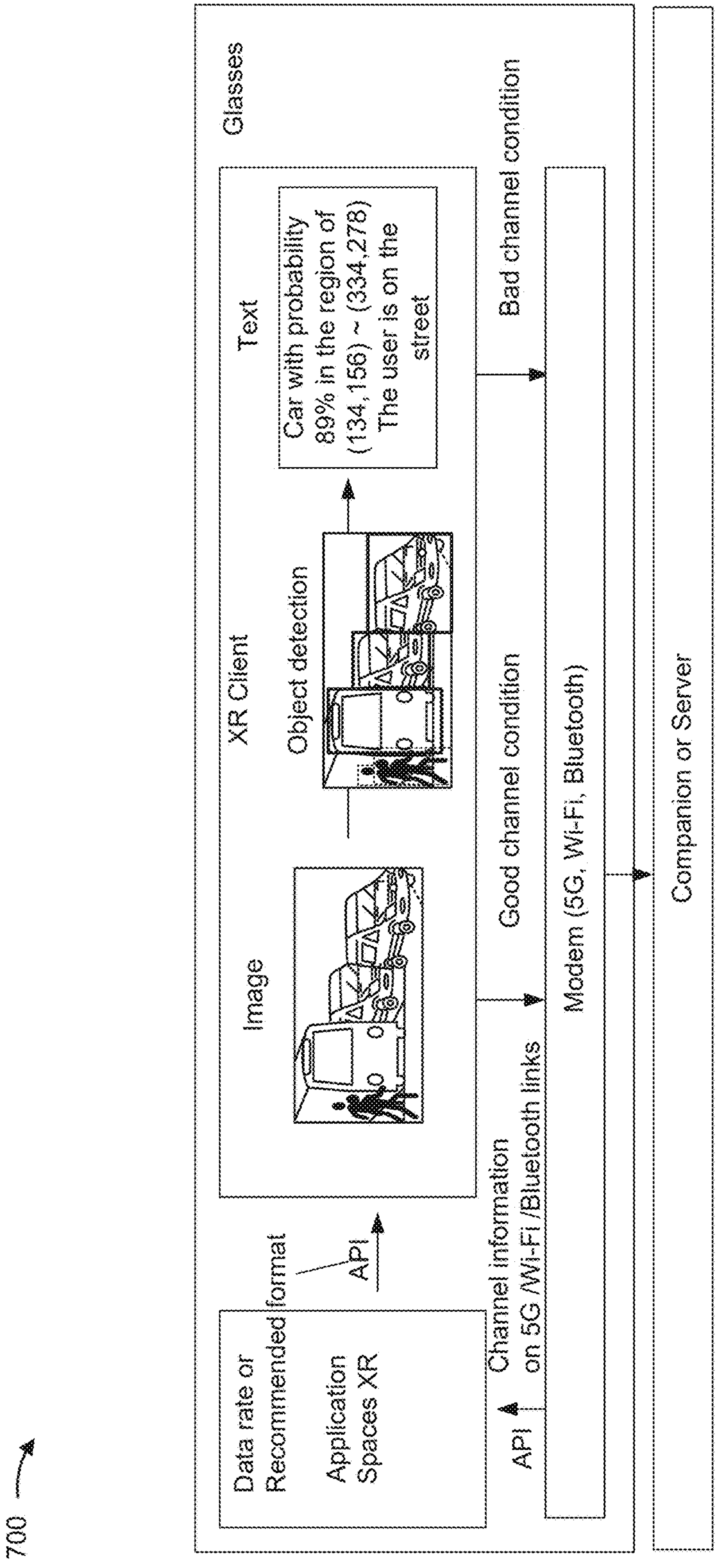
FIG. 7 is a diagram illustrating an example of a data control action for images.

FIG. 7 is a diagram illustrating an example 700 of a data control action for images.

Example 700 shows object detection to generate a textual description of an image. In good link conditions the semantic mode is an image. In bad link conditions, the semantic mode is a textual description of the image. The text may describe a focus of the image and an environment of the image.

For example, if the channel conditions for the link are not sufficient, the XR client may run the object detection or tracking algorithm and send the user environment information to the companion device or server. For example, object detection may result in a JSON format indicating a car, with a probability of 89% that the car is in the region identified by coordinates or parameters (134, 156)~(334, 278). In some aspects, the XR glasses may have on-device AI/ML models for object detection and object tracking.

As indicated above, FIG. 7 is provided as an example. Other examples may differ from what is described with regard to FIG. 7.

Figure 8:
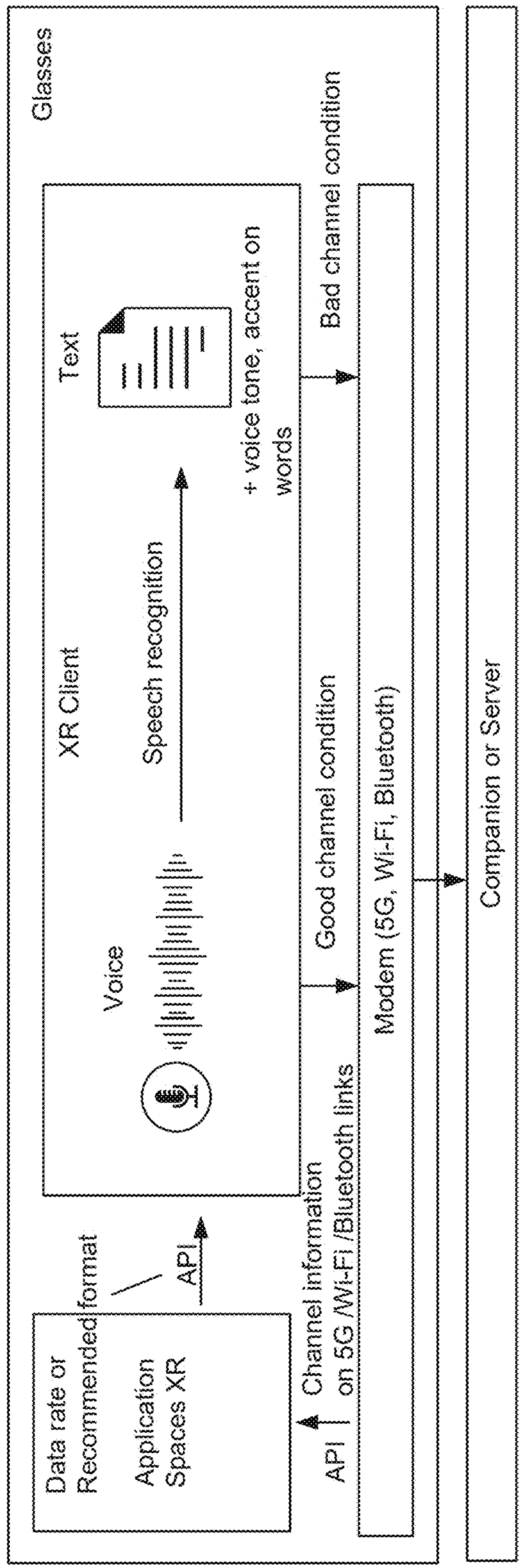
FIG. 8 is a diagram illustrating an example of a data control function for audio.

FIG. 8 is a diagram illustrating an example 800 of a data control function for audio.

Example 800 shows speech recognition generate a textual description of audio (e.g., via speech recognition). In good link conditions the semantic mode is the audio. In bad link conditions, the semantic mode is a textual description of the audio.

If channel conditions are not sufficient, the XR client may run a speech recognition algorithm and send the text script result to the companion device or server. The XR client may provide some extra information (e.g., voice tone, accent on words). The companion device or server may preconfigure an on-device AI/ML model for speech recognition algorithms.

In some aspects, the XR glasses may send both the text and the audio simultaneously (layered semantic modals). If the audio packets do not arrive in time or are interrupted during the audio speech, the companion device or the cloud (e.g., XR server) may process the AI processing with the text. The text-based processing may start from the beginning or in the middle of the audio speech. The XR glasses (e.g., XR client) may send the timing synchronization information between the text and the audio. There may be intermediate timestamp information associated with playout synchronization of textual description with the audio. For example, each sentence of the text includes a timestamp in the audio playout timeline.

As indicated above, FIG. 8 is provided as an example. Other examples may differ from what is described with regard to FIG. 8.

Figure 9:
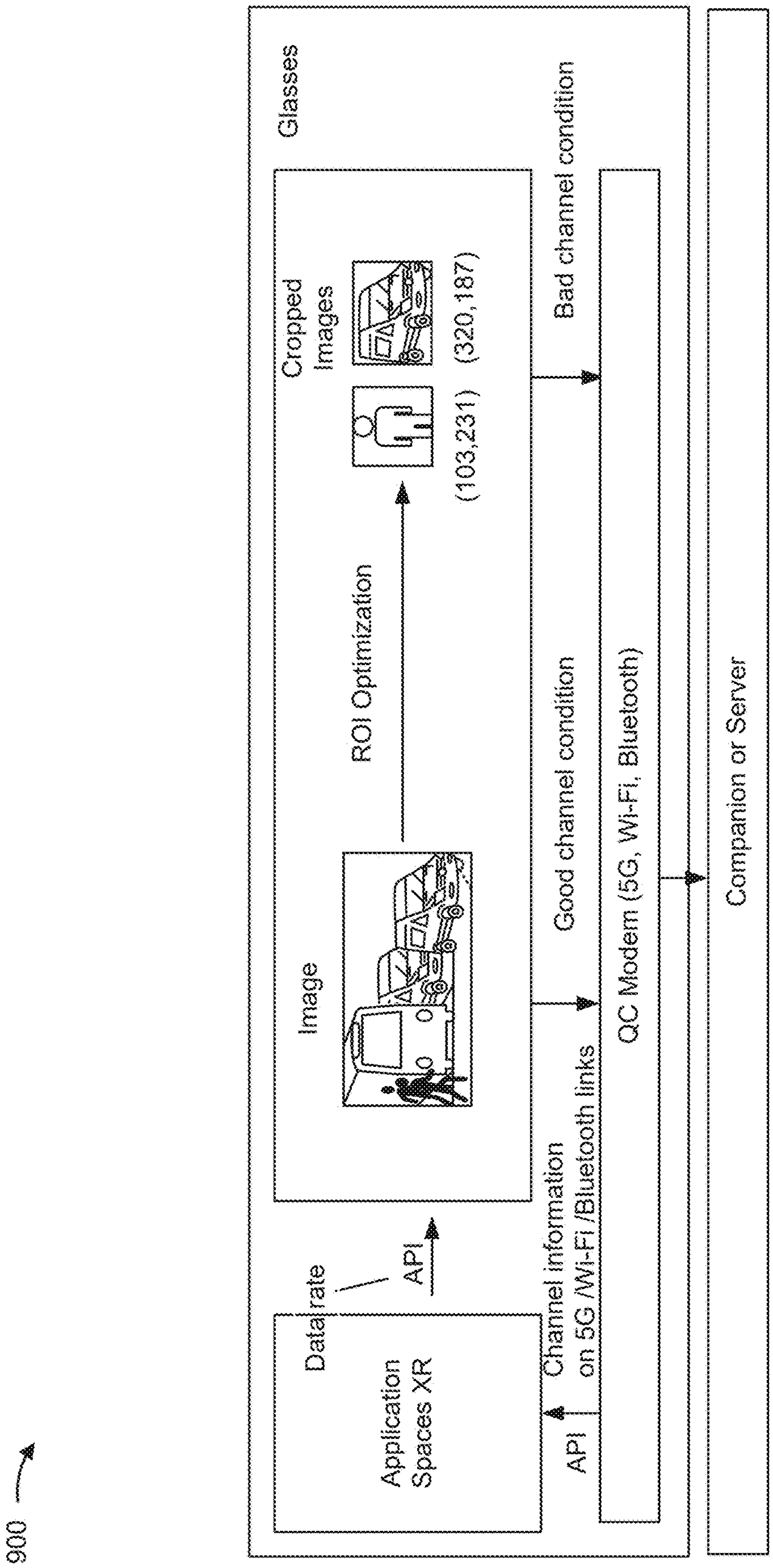
FIG. 9 is a diagram illustrating an example of a data control function for video or an image.

FIG. 9 is a diagram illustrating an example 900 of a data control function for video or an image.

Example 900 shows using a region of interest (ROI) of an image to generate a cropped version of the image. In good link conditions the semantic mode is an image. In bad link conditions, the semantic mode is a cropped version of an ROI of the image. This cropping may apply to video as well.

The XR glasses may provide multiple cropped images and mark the cropped pixel region on the full frame. The companion device or server may provide supportable cropped image sizes, decision criteria (e.g., data rate threshold), decision algorithm (e.g., ROI selection), and/or on-device AI/ML model to the XR glasses. Also, the companion device or server may provide some metadata information to help the ROI optimization at the XR glasses (e.g., hand tracking).

If the channel conditions for the link are not sufficient, the XR client may run the ROI selection algorithm and send cropped images to the companion device or server, which can request specific ROIs or provide the criteria for ROI decisions to the XR glasses. The XR glasses may have an on-device AI/ML model and algorithm for an ROI decision.

As indicated above, FIG. 9 is provided as an example. Other examples may differ from what is described with regard to FIG. 9.

Figure 10:
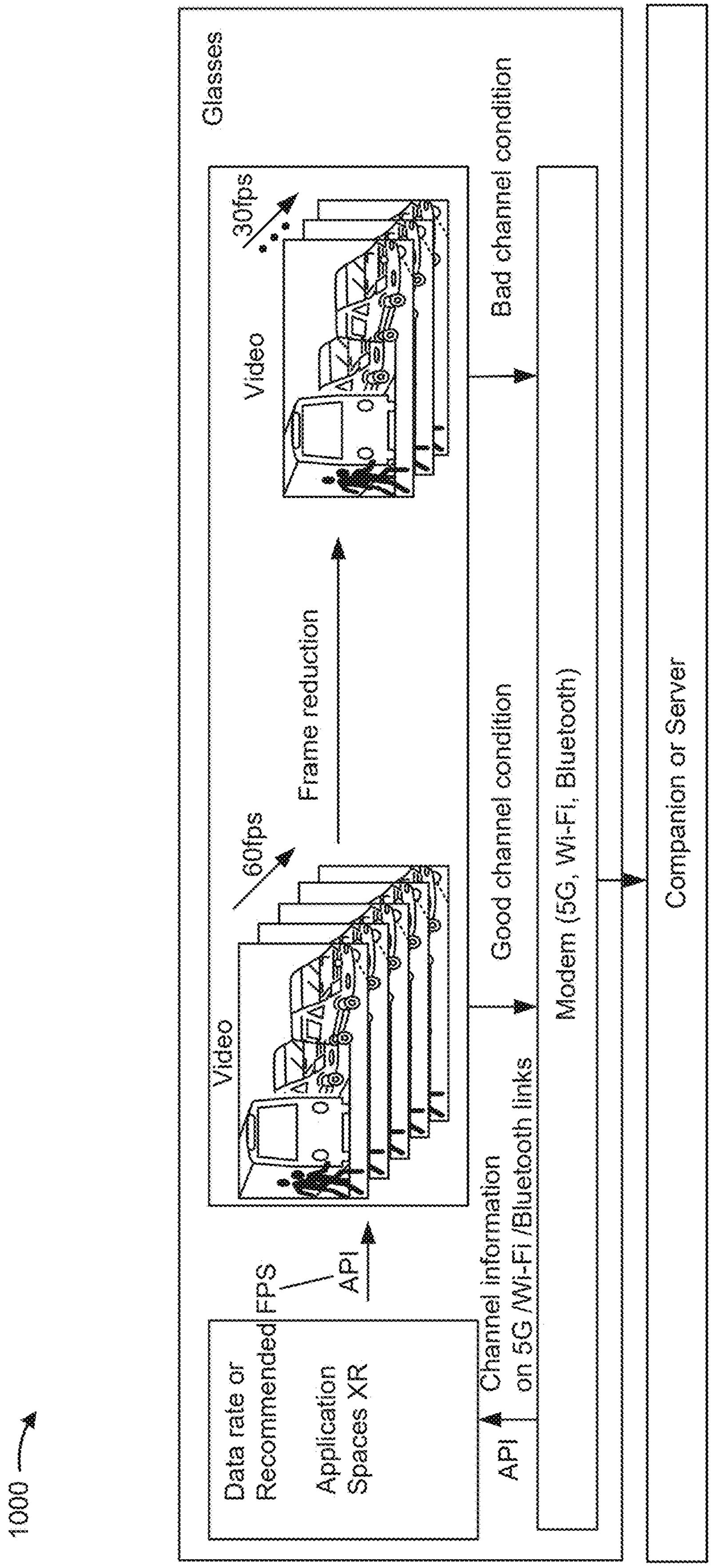
FIG. 10 is a diagram illustrating an example of a data control function for video.

FIG. 10 is a diagram illustrating an example 1000 of a data control function for video.

Example 1000 shows using frame reduction to reduce the amount of data transferred for video. In good link conditions the semantic mode is the video. In bad link conditions, the semantic mode is a reduced frame rate for the video.

If channel conditions for the link are not sufficient, the XR client may reduce the frame rate and send a lower frames-per-second (FPS) video to the companion device or server. The XR client may determine the appropriate minimum FPS. The companion device or server may request a specific FPS or provide criteria for FPS decisions. The XR glasses may have an on-device AI/ML model or algorithm for such FPS decisions.

As indicated above, FIG. 10 is provided as an example. Other examples may differ from what is described with regard to FIG. 10.

Figure 11:
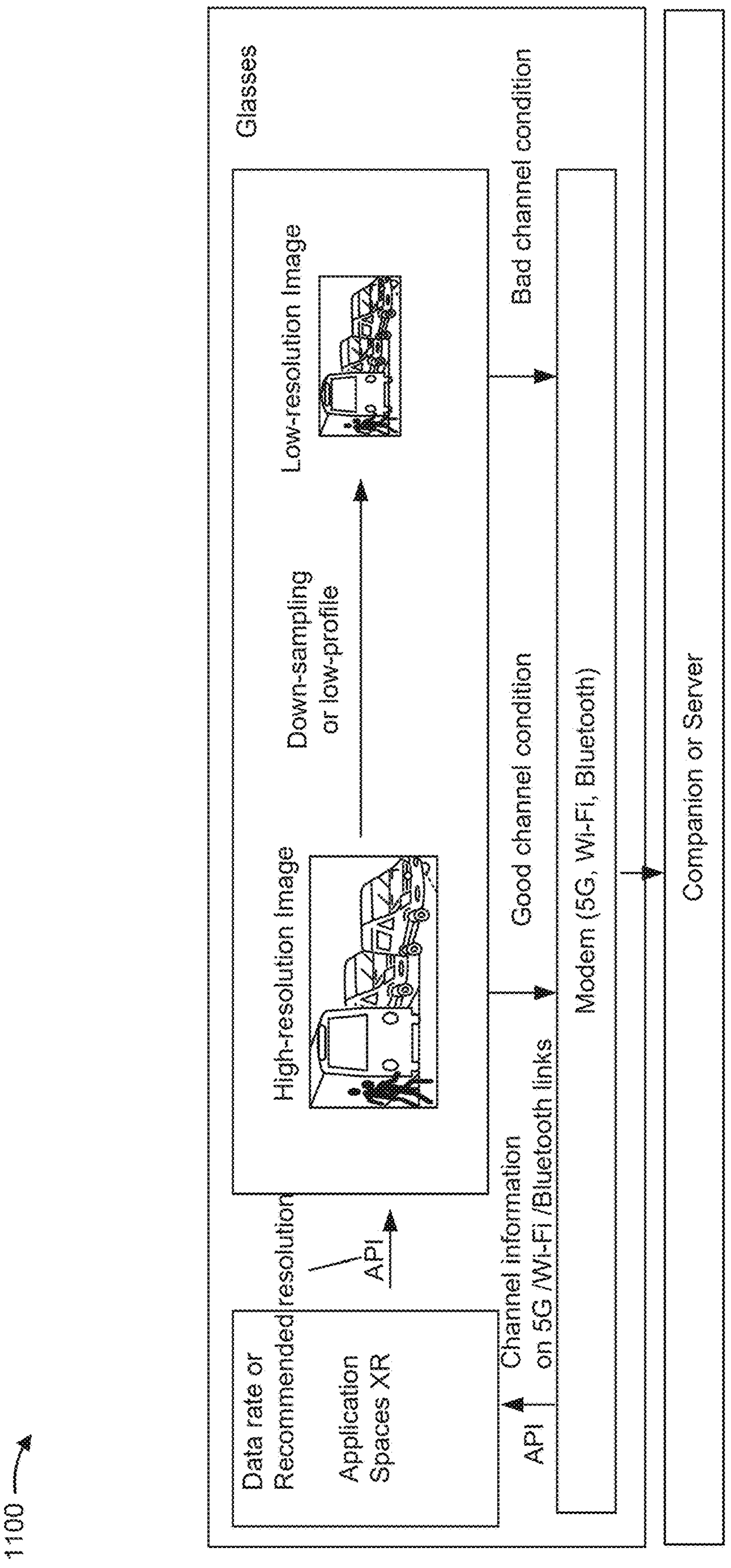
FIG. 11 is a diagram illustrating an example of a data control function for an image.

FIG. 11 is a diagram illustrating an example 1100 of a data control function for an image.

Example 1100 shows using down-sampling or a low-profile parameter to reduce the resolution for the image. In good link conditions the semantic mode is the image. In bad link conditions, the semantic mode is a low-resolution version of the image.

In an example, if channel conditions are not sufficient, the XR client may select the low profile for audio encoding and send a lower resolution image to the companion device or server. The XR client may determine the appropriate minimum resolution based at least in part in on the object types in the image. The companion device or server may request a specific resolution or provide criteria for resolution decisions. The XR glasses may have an on-device AI/ML model or algorithm for resolution decisions.

As indicated above, FIG. 11 is provided as an example. Other examples may differ from what is described with regard to FIG. 11.

Figure 12:
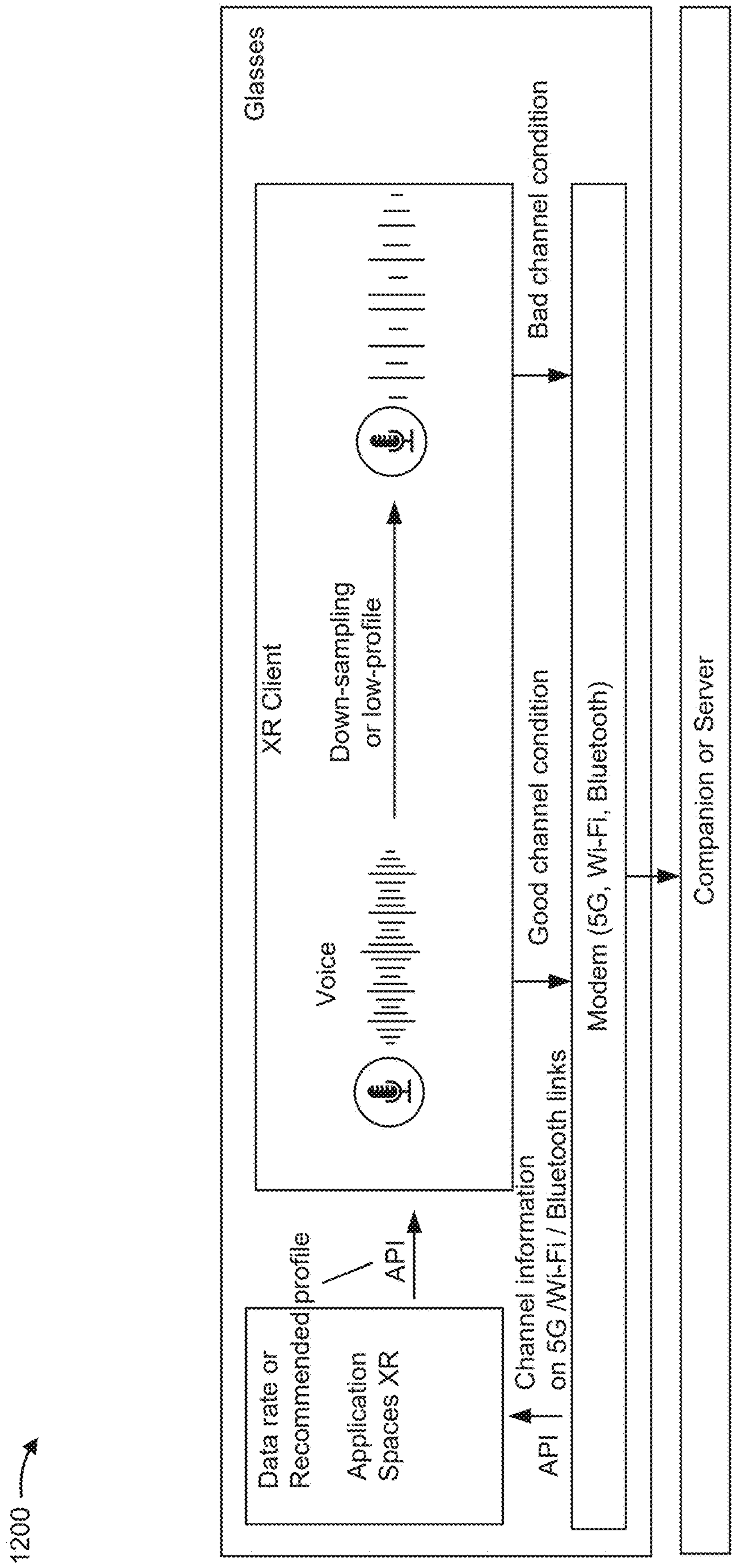
FIG. 12 is a diagram illustrating an example of a data control function for audio.

FIG. 12 is a diagram illustrating an example 1200 of a data control function for audio.

Example 1200 shows using down-sampling or a low-profile parameter to reduce the data for audio. In good link conditions, the semantic mode is the audio. In bad link conditions, the semantic mode is a low sampling rate version of the audio.

For example, if channel conditions are not sufficient, the XR client may select the low profile for audio encoding and send low-quality audio to the companion device or server. The XR client may determine the appropriate minimum profile based at least in part on the SNR of the link.

The companion device or server may request a specific profile or provide criteria for profile decisions. The XR glasses may have an on-device AI/ML model or algorithm for profile decisions.

As indicated above, FIG. 12 is provided as an example. Other examples may differ from what is described with regard to FIG. 12.

Figure 13:
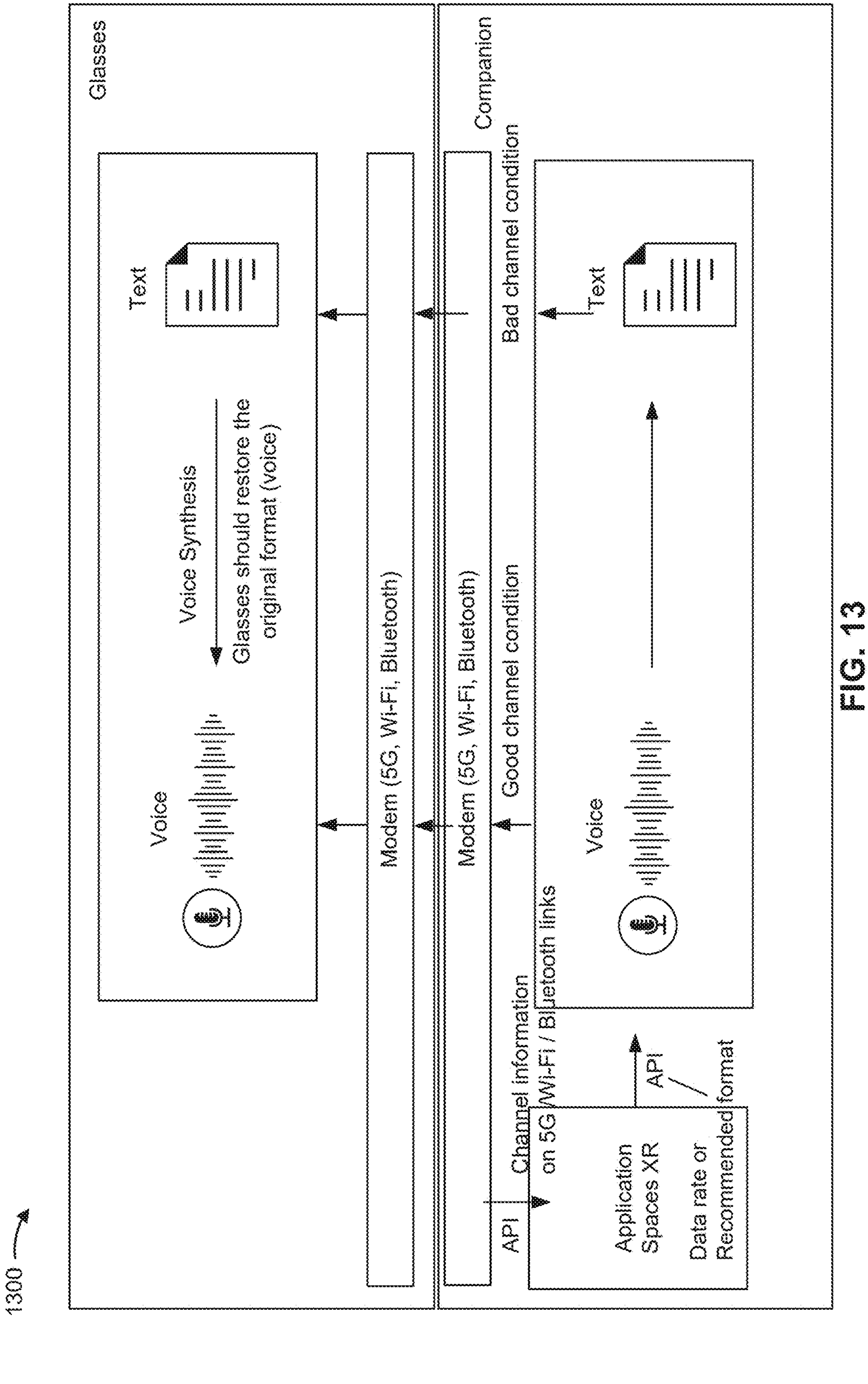
FIG. 13 is a diagram illustrating an example of a data control function for audio.

FIG. 13 is a diagram illustrating an example 1300 of a data control function for audio.

Example 1300 shows using voice synthesis to restore audio from a textual description of the audio. In good link conditions, the semantic mode is the audio. In bad link conditions, the semantic mode is a textual description of the audio that is restored by voice synthesis at the receiver. In some aspects, the XR glasses may transmit both the audio and the textual description (whole audio or part of the audio).

For AI responses, if channel conditions for the link are not sufficient to support AI output, the companion device or server may adjust the format of AI processing results, and the XR glasses may restore the original format, if necessary. For dynamic mode switching, if channel conditions are not sufficient, the companion device or server may adjust the format of the AI results, such as providing text of the audio instead of the audio. The XR glasses may restore the original semantic mode format (e.g., from text back to audio).

For dynamic encoding profile adaptation associated with AI processing results, the XR glasses may adapt an encoding profile, such as adjusting the FPS or the resolution for video or an image. This may include switching from a high FPS to a low FPS for video or an image, switching from a high resolution to a low resolution for video or an image, or switching from a high profile (e.g., high quantization level) to a low profile (e.g., low quantization level) for video or an image. The profile adaptation may also include switching from a high quality (e.g., high sample rate, high quantization level) voice conversation to a low quality (e.g., low sample rate, low quantization level) voice conversation.

As indicated above, FIG. 13 is provided as an example. Other examples may differ from what is described with regard to FIG. 13.

FIG. 14 is a diagram illustrating an example 1400 of operations between layers of XR glasses.

In some aspects, the XR application may determine and suggest the best format and encoding profile to the XR client. The XR application may provide the traffic requirements (e.g., latency) for each traffic flow. According to the channel conditions for the link, the XR application may determine the semantic mode and suggest the semantic mode of the encoding profile to the XR client. The XR client may adopt the data format accordingly.

In some aspects, the XR glasses may provide channel information (e.g., data rate, congestion level, latency) to the XR application, and the XR client may determine the semantic mode based at least in part on the channel information. Decisions may take place within the application space or a connectivity module. Example 1400 shows an application space, a layer where the XR glasses operate, a user space, a kernel space, and a connectivity layer (e.g., WLAN driver/host).

Example 1400 also shows APIs that may pass information between components, spaces, or layers. An API may include a configuration API (for a configuration from the application layer to the connectivity layer), an evaluation request API (application layer request to evaluate data traffic), an evaluation response API (e.g., wireless metrics, feedback from data transfer), a wireless state notification API, and a data traffic schedule request API.

Interface details of the configuration API may include a time constraint, a power constraint, a periodic reporting request, and an application type. Interface details for the evaluation request API may include a transmission payload size and an FPS/burst definition. Interface details of the evaluation response API may include a signal strength, throughput, a channel availability percentage, a time estimate, or a power estimate. Interface details of the wireless state notification API may include a signal strength, throughput, or a channel availability percentage. Interface details of the data traffic schedule API may include a time budget to drain traffic or a requirement (e.g., time, power) to satisfy traffic initiation.

As indicated above, FIG. 14 is provided as an example. Other examples may differ from what is described with regard to FIG. 14.

FIG. 1500 is a diagram illustrating an example 1500 of layer messaging.

Example 1500 shows messages that are sent between components or layers of XR glasses, including a smart glass application layer 1502, an XR platform layer 1504, a user and kernel space 1506, and a connectivity layer, such a WLAN driver and stack 1508. The messages may be used for estimating wireless metrics and for determining how to perform a data transfer.

As shown by reference number 1510, the XR platform layer 1504, the user and kernel space 1506, and the WLAN driver and stack 1508 may establish support for connectivity metric measurement and reporting. As shown by reference number 1512, the smart glass application layer 1502 may provide an application configuration with traffic details to the XR platform layer 1504. As shown by reference number 1514, the smart glass application layer 1502 may provide a reporting configuration to the other layers or components. As shown by reference number 1516, the WLAN driver and stack 1508 may be configured for reporting. As shown by reference number 1518, the smart glass application layer 1502 may initiate estimating a data transfer. As shown by reference number 1520, the smart glass application layer 1502 may obtain an estimate (e.g., time, latency) for the data transfer.

As shown by reference number 1522, the smart glass application layer 1502 may determine a data control action for the data transfer. As shown by reference number 1524, the smart glass application layer 1502 may initiate the data transfer using the data control action. As shown by reference number 1526, the WLAN driver and stack 1508 may switch semantic modes or buffer data according to the data control action to satisfy any constraints on the data transfer. As a result, the XR glasses may conserve power and manage an appropriate level of throughput for the data transfer.

This cross-layer metric exchange may be periodic or request/response-based using APIs. While the connectivity layer in example 1500 involves a WLAN, the connectivity layer may also involve a cellular network (e.g., 5G/6G).

Figure 15:
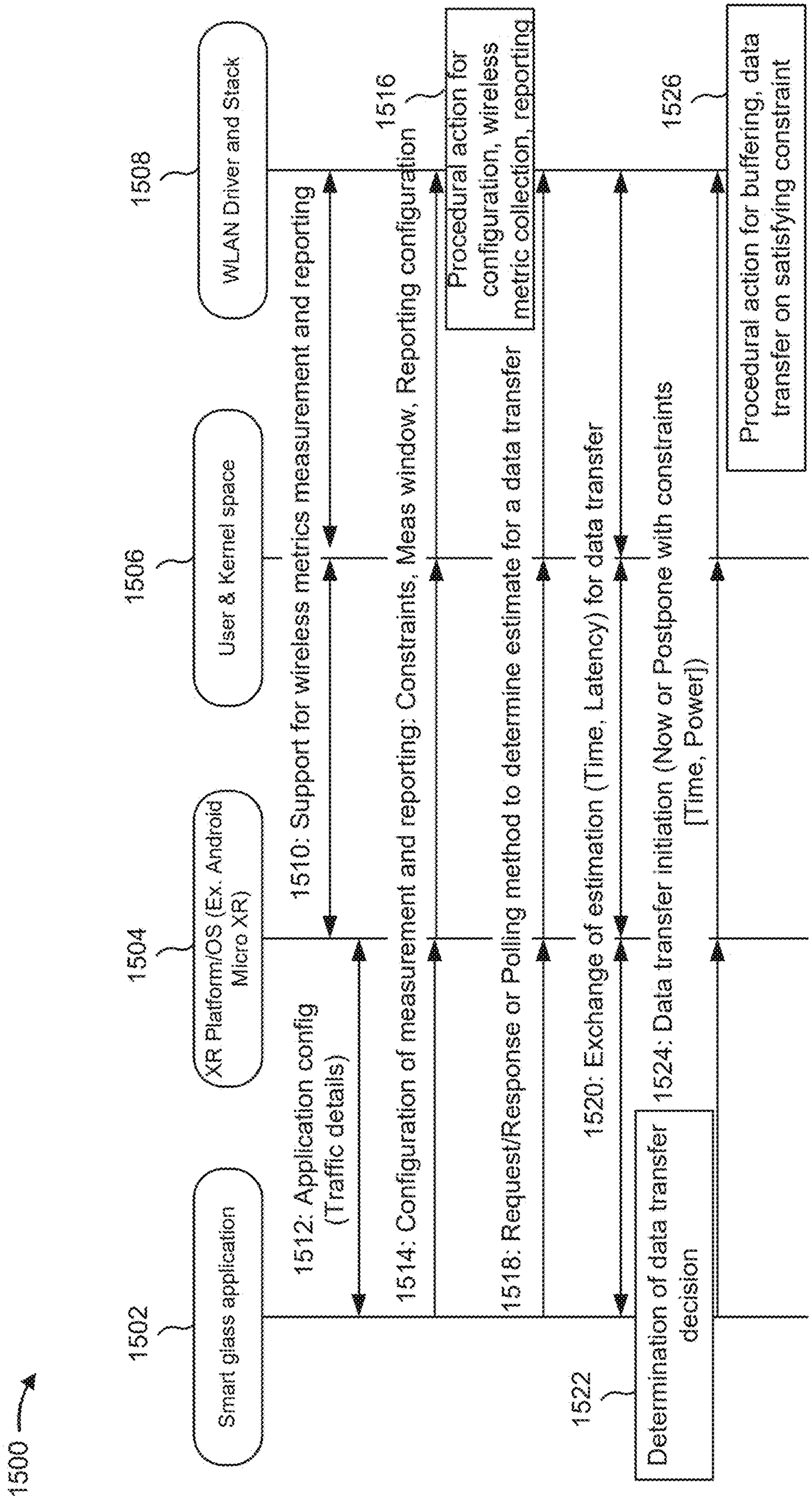
FIG. 15 is a diagram illustrating an example of layer messaging.

As indicated above, FIG. 15 is provided as an example. Other examples may differ from what is described with regard to FIG. 15.

FIG. 16 is a diagram illustrating an example process 1600 performed, for example, at a wireless device or an apparatus of a wireless device. Example process 1600 is an example where the apparatus or the wireless device (e.g., XR glasses 130) performs operations associated with a data control action for XR data exchange.

As shown in FIG. 16, in some aspects, process 1600 may include identifying a trigger for a transfer of data on a wireless link that is associated with extended reality (block 1610). For example, the wireless device (e.g., using communication manager 140, depicted in FIG. 1) may identify a trigger for a transfer of data on a wireless link that is associated with extended reality, as described above.

As further shown in FIG. 16, in some aspects, process 1600 may include exchanging the data on the wireless link using a data control action that is based at least in part on an application type of the transfer, where the application type is real-time streaming or non-real-time streaming (block 1620). For example, the wireless device (e.g., using communication manager 140, depicted in FIG. 1) may exchange the data on the wireless link using a data control action that is based at least in part on an application type of the transfer, where the application type is real-time streaming or non-real-time streaming, as described above.

Process 1600 may include additional aspects, such as any single aspect or any combination of aspects described below or in connection with one or more other processes described elsewhere herein.

In a first aspect, the application type is real-time streaming, and the data control action includes switching a semantic mode of the data.

In a second aspect, alone or in combination with the first aspect, switching the semantic mode includes switching between video and video images for the data of the transfer.

In a third aspect, alone or in combination with one or more of the first and second aspects, switching the semantic mode includes switching between images and textual descriptions of the images for the data of the transfer.

In a fourth aspect, alone or in combination with one or more of the first through third aspects, switching between the video and the video images includes using key frame selection.

In a fifth aspect, alone or in combination with one or more of the first through fourth aspects, process 1600 includes receiving criteria for the key frame selection.

In a sixth aspect, alone or in combination with one or more of the first through fifth aspects, switching between the images and the textual descriptions of the images includes using object detection or tracking.

In a seventh aspect, alone or in combination with one or more of the first through sixth aspects, switching the semantic mode includes switching between audio and textual descriptions of the audio for the data of the transfer.

In an eighth aspect, alone or in combination with one or more of the first through seventh aspects, exchanging the data includes exchanging both the audio and the textual descriptions. In some aspects, the textual descriptions each have an intermediate timestamp information associated with playout synchronization of the textual descriptions with the audio.

In a ninth aspect, alone or in combination with one or more of the first through eighth aspects, process 1600 includes receiving metadata, format information, or decision criteria associated with switching the semantic mode.

In a tenth aspect, alone or in combination with one or more of the first through ninth aspects, the data control action includes switching between video or an image, and a cropped version of the video or the image, for the data of the transfer.

In an eleventh aspect, alone or in combination with one or more of the first through tenth aspects, process 1600 includes selecting a region of interest for the cropped version.

In a twelfth aspect, alone or in combination with one or more of the first through eleventh aspects, the application type is real-time streaming, and the data control action includes switching between a high-profile parameter and a low-profile parameter.

In a thirteenth aspect, alone or in combination with one or more of the first through twelfth aspects, process 1600 includes receiving profile adaptation information associated with the switching between the high-profile parameter and the low-profile parameter.

In a fourteenth aspect, alone or in combination with one or more of the first through thirteenth aspects, a parameters (e.g., the high-profile parameters or the low-profile parameter) is associated with frames per second, a video resolution, an image resolution, a quantization level, an audio encoding rate, or a sample rate.

In a fifteenth aspect, alone or in combination with one or more of the first through fourteenth aspects, identifying the trigger includes receiving a request for the data or determining that a condition for the transfer of the data has been satisfied.

In a sixteenth aspect, alone or in combination with one or more of the first through fifteenth aspects, the application type is real-time streaming, and the data control action includes adjusting a format of machine learning processing results or a data encoding profile of the machine learning profile results.

In a seventeenth aspect, alone or in combination with one or more of the first through sixteenth aspects, process 1600 includes receiving channel information, and determining a target semantic mode for the data based at least in part on the channel information.

In an eighteenth aspect, alone or in combination with one or more of the first through seventeenth aspects, process 1600 includes receiving information that indicates a target semantic mode for the data.

In a nineteenth aspect, alone or in combination with one or more of the first through eighteenth aspects, the application type is non-real-time streaming, and the data control action includes buffering the data, and transmitting the data based at least in part on a determination that a condition of the wireless link satisfies a link threshold.

In a twentieth aspect, alone or in combination with one or more of the first through nineteenth aspects, the condition includes a cross-layer connectivity metric, and process 1600 includes providing the cross-layer connectivity metric from a connectivity layer to an application layer.

In a twenty-first aspect, alone or in combination with one or more of the first through twentieth aspects, process 1600 includes providing, between the connectivity layer and the application layer, feedback on transfer of the data based at least in part on the cross-layer connectivity metric, wherein the feedback includes time for the transfer of the data, a power utilization estimate, or a combination thereof.

In a twenty-second aspect, alone or in combination with one or more of the first through twenty-first aspects, process 1600 includes, based at least in part on the feedback, displaying a data transfer notification, a power notification, or a suggested action for a user.

In a twenty-third aspect, alone or in combination with one or more of the first through twenty-second aspects, process 1600 includes, based at least in part on the feedback, displaying navigation assistance for a user.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
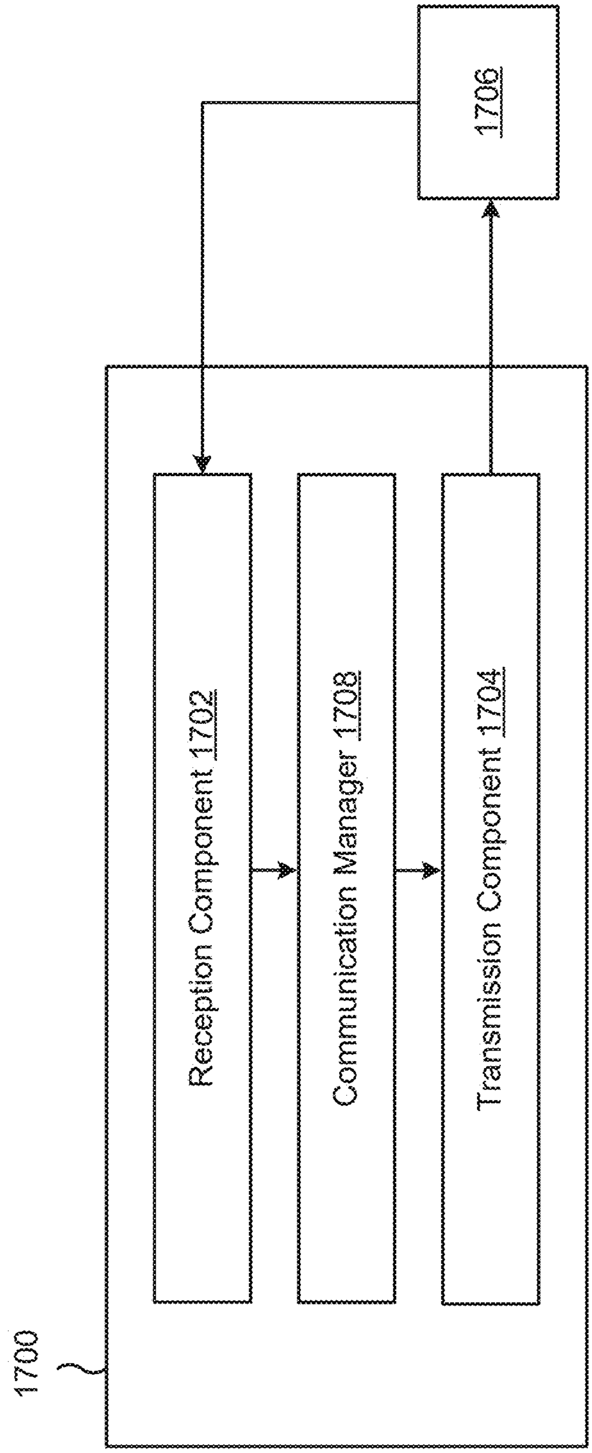
FIG. 17 is a diagram of an example apparatus for wireless communication.

FIG. 17 is a diagram of an example apparatus 1700 for wireless communication. The apparatus 1700 may be a wireless device, or a wireless device may include the apparatus 1700. In some aspects, the apparatus 1700 includes a reception component 1702, a transmission component 1704, or a communication manager 1706, which may be in communication with one another (for example, via one or more buses or one or more other components). In some aspects, the communication manager 1706 is the communication manager 140 described in connection with FIG. 1. As shown, the apparatus 1700 may communicate with another apparatus 1708, such as a UE or a network node (such as a CU, a DU, an RU, or a base station), using the reception component 1702 and the transmission component 1704. The communication manager 1706 may be included in, or implemented via, a processing system of the wireless device.

In some aspects, the apparatus 1700 may be configured to perform one or more operations described herein in connection with FIGS. 1-15. Additionally, or alternatively, the apparatus 1700 may be configured to perform one or more processes described herein, such as process 1600 of FIG. 16. In some aspects, the apparatus 1700 or one or more components shown in FIG. 17 may include one or more components of the wireless device described in connection with FIG. 1. Additionally, or alternatively, one or more components shown in FIG. 17 may be implemented within one or more components described in connection with FIG. 1. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1702 may receive communications, such as reference signals, control information, data communications, or a combination thereof, from the apparatus 1708. The reception component 1702 may provide received communications to one or more other components of the apparatus 1700. In some aspects, the reception component 1702 may perform signal processing on the received communications, and may provide the processed signals to the one or more other components of the apparatus 1700. In some aspects, the reception component 1702 may include one or more components of the wireless device described above in connection with FIG. 1, such as a radio, one or more RF chains, one or more transceivers, or one or more modems, each of which may in turn be coupled with one or more antennas of the wireless device.

The transmission component 1704 may transmit communications, such as reference signals, control information, data communications, or a combination thereof, to the apparatus 1708. In some aspects, one or more other components of the apparatus 1700 may generate communications and may provide the generated communications to the transmission component 1704 for transmission to the apparatus 1708. In some aspects, the transmission component 1704 may perform signal processing on the generated communications, and may transmit the processed signals to the apparatus 1708. In some aspects, the transmission component 1704 may include one or more components of the wireless device described above in connection with FIG. 1, such as a radio, one or more RF chains, one or more transceivers, or one or more modems, each of which may in turn be coupled with one or more antennas of the wireless device described in connection with FIG. 1. In some aspects, the transmission component 1704 may be co-located with the reception component 1702.

The communication manager 1706 may support operations of the reception component 1702 or the transmission component 1704. For example, the communication manager 1706 may receive information associated with configuring reception of communications by the reception component 1702 or transmission of communications by the transmission component 1704. Additionally, or alternatively, the communication manager 1706 may generate or provide control information to the reception component 1702 or the transmission component 1704 to control reception or transmission of communications.

The communication manager 1706 may identify a trigger for a transfer of data on a wireless link that is associated with extended reality. The communication manager 1706 may exchange the data on the wireless link using a data control action that is based at least in part on an application type of the transfer, wherein the application type is real-time streaming or non-real-time streaming.

The reception component 1702 may receive criteria for the key frame selection. The reception component 1702 may receive metadata, format information, or decision criteria associated with switching the semantic mode. The communication manager 1706 may select a region of interest for the cropped version. The reception component 1702 may receive profile adaptation information associated with the switching between the high-profile parameter and the low-profile parameter.

The reception component 1702 may receive channel information. The communication manager 1706 may determine a target semantic mode for the data based at least in part on the channel information.

The reception component 1702 may receive information that indicates a target semantic mode for the data.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a wireless device, comprising: identifying a trigger for a transfer of data on a wireless link that is associated with extended reality; and exchanging the data on the wireless link using a data control action that is based at least in part on an application type of the transfer, wherein the application type is real-time streaming or non-real-time streaming.

Aspect 2: The method of Aspect 1, wherein the application type is real-time streaming, and wherein the data control action includes switching a semantic mode of the data.

Aspect 3: The method of Aspect 2, wherein switching the semantic mode includes switching between video and video images for the data of the transfer.

Aspect 4: The method of Aspect 3, wherein switching between the video and the video images includes using key frame selection.

Aspect 5: The method of Aspect 4, further comprising receiving criteria for the key frame selection.

Aspect 6: The method of Aspect 2, wherein switching the semantic mode includes switching between images and textual descriptions of the images for the data of the transfer.

Aspect 7: The method of Aspect 6, wherein switching between the images and the textual descriptions of the images includes using object detection or tracking.

Aspect 8: The method of Aspect 2, wherein switching the semantic mode includes switching between audio and textual descriptions of the audio for the data of the transfer.

Aspect 9: The method of Aspect 8, wherein exchanging the data includes exchanging both the audio and the textual descriptions.

Aspect 10: The method of Aspect 2, wherein the textual descriptions each have an intermediate timestamp information associated with playout synchronization of the textual descriptions with the audio.

Aspect 11: The method of Aspect 2, further comprising receiving metadata, format information, or decision criteria associated with switching the semantic mode.

Aspect 12: The method of Aspect 2, wherein the data control action includes switching between video or an image, and a cropped version of the video or the image, for the data of the transfer.

Aspect 13: The method of Aspect 12, further comprising selecting a region of interest for the cropped version.

Aspect 14: The method of any of Aspects 1-13, wherein the application type is real-time streaming, and wherein the data control action includes switching between a high-profile parameter and a low-profile parameter.

Aspect 15: The method of Aspect 14, further comprising receiving profile adaptation information associated with the switching between the high-profile parameter and the low-profile parameter.

Aspect 16: The method of Aspect 14, wherein the high-profile parameters or the low-profile parameter is associated with frames per second, a video resolution, an image resolution, a quantization level, an audio encoding rate, or a sample rate.

Aspect 17: The method of any of Aspects 1-16, wherein identifying the trigger includes receiving a request for the data or determining that a condition for the transfer of the data has been satisfied.

Aspect 18: The method of any of Aspects 1 and 15-17, wherein the application type is real-time streaming, and wherein the data control action includes adjusting a format of machine learning processing results.

Aspect 19: The method of any of Aspects 1 and 15-18, wherein the application type is real-time streaming, and wherein the data control action includes adjusting a data encoding profile of machine learning processing results.

Aspect 20: The method of any of Aspects 1-19, further comprising: receiving channel information; and determining a target semantic mode for the data based at least in part on the channel information.

Aspect 21: The method of any of Aspects 1-20, further comprising receiving information that indicates a target semantic mode for the data.

Aspect 22: The method of any of Aspects 1-13, wherein the application type is non-real-time streaming, and wherein the data control action includes: buffering the data; and transmitting the data based at least in part on a determination that a condition of the wireless link satisfies a link threshold.

Aspect 23: The method of Aspect 22, wherein the condition includes a cross-layer connectivity metric, and wherein the method includes providing the cross-layer connectivity metric from a connectivity layer to an application layer.

Aspect 24: The method of Aspect 23, further comprising providing, between the connectivity layer and the application layer, feedback on transfer of the data based at least in part on the cross-layer connectivity metric, wherein the feedback includes time for the transfer of the data, a power utilization estimate, or a combination thereof.

Aspect 25: The method of Aspect 24, further comprising, based at least in part on the feedback, displaying a data transfer notification, a power notification, or a suggested action for a user.

Aspect 26: The method of Aspect 24, further comprising, based at least in part on the feedback, displaying navigation assistance for a user.

Aspect 27: A method of wireless communication performed by a wireless device, comprising: identifying a trigger for a transfer of data on a wireless link that is associated with extended reality; and exchanging the data on the wireless link using a data control action that is based at least in part on an application type of the transfer, wherein the application type is real-time streaming or non-real-time streaming.

Aspect 28: The method of Aspect 27, wherein the application type is real-time streaming, and wherein the data control action includes switching a semantic mode of the data.

Aspect 29: The method of Aspect 27 or 28, wherein switching the semantic mode includes, for the data of the transfer: switching between video and video images, switching between images and textual descriptions of the images, switching between audio and textual descriptions of the audio, switching between the video or an image, and a cropped version of the video or the image, or switching between a high-profile parameter and a low-profile parameter.

Aspect 30: The method of Aspect 27, wherein the application type is non-real-time streaming, and wherein the data control action includes: buffering the data; and transmitting the data based at least in part on a determination that a condition of the wireless link satisfies a link threshold.

Aspect 31: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-30.

Aspect 32: An apparatus for wireless communication at a device, the apparatus comprising one or more memories and one or more processors coupled to the one or more memories, the one or more processors configured to cause the device to perform the method of one or more of Aspects 1-30.

Aspect 33: An apparatus for wireless communication, the apparatus comprising at least one means for performing the method of one or more of Aspects 1-30.

Aspect 34: A non-transitory computer-readable medium storing code for wireless communication, the code comprising instructions executable by one or more processors to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

Aspect 36: A device for wireless communication, the device comprising a processing system that includes one or more processors and one or more memories coupled with the one or more processors, the processing system configured to cause the device to perform the method of one or more of Aspects 1-30.

Aspect 37: An apparatus for wireless communication at a device, the apparatus comprising one or more memories and one or more processors coupled to the one or more memories, the one or more processors individually or collectively configured to cause the device to perform the method of one or more of Aspects 1-30.

Aspect 38: A device comprising a processing system that includes one or more processors and one or more code-storing memories coupled with the one or more processors, the processing system configured to cause the device to perform the method of one or more of Aspects 1-30.

Aspect 39: A device comprising a processing system that includes processor circuitry and code-storing memory circuitry, the processing system configured to cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects. No element, act, or instruction described herein should be construed as critical or essential unless explicitly described as such.

It will be apparent that systems or methods described herein may be implemented in different forms of hardware or a combination of hardware and software. The actual specialized control hardware or software used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, the articles “a” and “an” are intended to refer to one or more items and may be used interchangeably with “one or more” or “at least one.” Further, as used herein, the article “the” is intended to include one or more items referenced in connection with the article “the” and may be used interchangeably with “the one or more.” Furthermore, as used herein, the terms “set” and “group” are intended to include one or more items and may be used interchangeably with “one or more.” Where only one item is intended, the phrase “only one” or “a single one” or similar language is used. Also, as used herein, the terms “has,” “have,” “having,” “comprise,” “comprising,” “include” and “including,” and derivatives thereof or similar terms are intended to be open-ended terms that do not limit an element that they modify (for example, an element “having” A may also have B). Also, as used herein, the term “or” is intended to be inclusive when used in a series and may be used interchangeably with “and/or,” unless explicitly stated otherwise (for example, if used in combination with “either” or “only one of”). As used herein, a phrase referring to “at least one of” a list of items refers to any combination of those items, including single members. As an example, “at least one of: a, b, or c” is intended to cover a, b, c, a+b, a+c, b+c, and a +b+c, as well as any combination with multiples of the same element (for example, a +a, a+a+a, a+a+b, a+a+c, a+b+b, a+c+c, b+b, b+b+b, b+b+c, c+c, and c+c+c, or any other ordering of a, b, and c).

As used herein, the term “determine” or “determining” encompasses a wide variety of actions and, therefore, “determining” can include calculating, computing, processing, deriving, estimating, investigating, looking up (such as via looking up in a table, a database, or another data structure), searching, inferring, ascertaining, and/or measuring, among other possibilities. Also, “determining” can include receiving (such as receiving information), accessing (such as accessing data stored in memory) or transmitting (such as transmitting information), among other possibilities. Additionally, “determining” can include resolving, selecting, obtaining, choosing, establishing, and/or other such similar actions.

As used herein, the phrase “based on” is intended to mean “based at least in part on” or “based on or otherwise in association with” unless explicitly stated otherwise. As used herein, “satisfying a threshold” may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the scope of all aspects described herein. Many of these features may be combined in ways not specifically recited in the claims or disclosed in the specification. The disclosure of various aspects includes each dependent claim in combination with every other claim in the claim set.

What is claimed is:

1. A wireless device, comprising:

a processing system that includes one or more processors and one or more code-storing memories coupled with the one or more processors, the processing system configured to cause the wireless device to:

identify a trigger for a transfer of data on a wireless link that is associated with extended reality; and exchange the data on the wireless link using a data control action that is based at least in part on an application type of the transfer, wherein the application type is real-time streaming or non-real-time streaming.

2. The wireless device of claim 1, wherein the application type is real-time streaming, and wherein the data control action includes switching a semantic mode of the data.

3. The wireless device of claim 2, wherein the processing system, to cause the wireless device to switch the semantic mode, is configured to cause the wireless device to switch between video and video images for the data of the transfer.

4. The wireless device of claim 3, wherein the processing system, to cause the wireless device to switch between the video and the video images, is configured to cause the wireless device to use key frame selection.

5. The wireless device of claim 4, wherein the processing system is configured to cause the wireless device to receive criteria for the key frame selection.

6. The wireless device of claim 2, wherein the processing system, to cause the wireless device to switch the semantic mode, is configured to cause the wireless device to switch between images and textual descriptions of the images for the data of the transfer.

7. The wireless device of claim 6, wherein the processing system, to cause the wireless device to switch between the images and the textual descriptions of the images, is configured to cause the wireless device to use object detection or tracking.

8. The wireless device of claim 2, wherein the processing system, to cause the wireless device to switch the semantic mode, is configured to cause the wireless device to switch between audio and textual descriptions of the audio for the data of the transfer.

9. The wireless device of claim 8, wherein the processing system, to cause the wireless device to exchange the data, is configured to cause the wireless device to exchange both the audio and the textual descriptions.

10. The wireless device of claim 9, wherein the textual descriptions each have an intermediate timestamp information associated with playout synchronization of the textual descriptions with the audio.

11. The wireless device of claim 2, wherein the processing system is configured to cause the wireless device to receive metadata, format information, or decision criteria associated with switching the semantic mode.

12. The wireless device of claim 2, wherein the data control action includes switching between video or an image, and a cropped version of the video or the image, for the data of the transfer.

13. The wireless device of claim 12, wherein the processing system is configured to cause the wireless device to select a region of interest for the cropped version.

14. The wireless device of claim 1, wherein the application type is real-time streaming, and wherein the data control action includes switching between a high-profile parameter and a low-profile parameter.

15. The wireless device of claim 14, wherein the processing system is configured to cause the wireless device to receive profile adaptation information associated with the switching between the high-profile parameter and the low-profile parameter.

16. The wireless device of claim 14, wherein the high-profile parameter or the low-profile parameter is associated with frames per second, a video resolution, an image resolution, a quantization level, an audio encoding rate, or a sample rate.

17. The wireless device of claim 1, wherein the processing system, to cause the wireless device to identify the trigger, is configured to cause the wireless device to receive a request for the data or determining that a condition for the transfer of the data has been satisfied.

18. The wireless device of claim 1, wherein the application type is real-time streaming, and wherein the data control action includes adjusting a format of machine learning processing results.

19. The wireless device of claim 1, wherein the application type is real-time streaming, and wherein the data control action includes adjusting a data encoding profile of machine learning processing results.

20. The wireless device of claim 1, wherein the processing system is configured to cause the wireless device to:

receive channel information; and determine a target semantic mode for the data based at least in part on the channel information.

21. The wireless device of claim 1, wherein the processing system is configured to cause the wireless device to receive information that indicates a target semantic mode for the data.

22. The wireless device of claim 1, wherein the application type is non-real-time streaming, and wherein the data control action includes:

buffer the data; and transmit the data based at least in part on a determination that a condition of the wireless link satisfies a link threshold.

23. The wireless device of claim 22, wherein the condition includes a cross-layer connectivity metric, and wherein the processing system is configured to cause the wireless device to provide the cross-layer connectivity metric from a connectivity layer to an application layer.

24. The wireless device of claim 23, wherein the processing system is configured to cause the wireless device to provide, between the connectivity layer and the application layer, feedback on transfer of the data based at least in part on the cross-layer connectivity metric, wherein the feedback includes time for the transfer of the data, a power utilization estimate, or a combination thereof.

25. The wireless device of claim 24, wherein the processing system is configured to cause the wireless device to, based at least in part on the feedback, display a data transfer notification, a power notification, or a suggested action for a user.

26. The wireless device of claim 24, wherein the processing system is configured to cause the wireless device to, based at least in part on the feedback, display navigation assistance for a user.

27. A method of wireless communication performed by a wireless device, comprising:

identifying a trigger for a transfer of data on a wireless link that is associated with extended reality; and exchanging the data on the wireless link using a data control action that is based at least in part on an application type of the transfer, wherein the application type is real-time streaming or non-real-time streaming.

28. The method of claim 27, wherein the application type is real-time streaming, and wherein the data control action includes switching a semantic mode of the data.

29. The method of claim 28, wherein switching the semantic mode includes, for the data of the transfer:

switching between video and video images, switching between images and textual descriptions of the images, switching between audio and textual descriptions of the audio, switching between the video or an image, and a cropped version of the video or the image, or switching between a high-profile parameter and a low-profile parameter.

30. The method of claim 27, wherein the application type is non-real-time streaming, and wherein the data control action includes:

buffering the data; and transmitting the data based at least in part on a determination that a condition of the wireless link satisfies a link threshold.

* * * * *